(12) United States Patent
Iraha et al.

(10) Patent No.: US 8,781,674 B2
(45) Date of Patent: Jul. 15, 2014

(54) CONTROL APPARATUS FOR VEHICULAR POWER TRANSMITTING APPARATUS

(75) Inventors: Taira Iraha, Okazaki (JP); Kunio Hattori, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 845 days.

(21) Appl. No.: 12/888,059

(22) Filed: Sep. 22, 2010

(65) Prior Publication Data
US 2011/0087397 A1    Apr. 14, 2011

(30) Foreign Application Priority Data
Oct. 14, 2009    (JP) ................... 2009-237764

(51) Int. Cl.
| | |
|---|---|
| G06F 11/30 | (2006.01) |
| G07C 5/00 | (2006.01) |
| G01M 17/00 | (2006.01) |
| G06F 7/00 | (2006.01) |
| G06F 19/00 | (2011.01) |

(52) U.S. Cl.
USPC ............. 701/31.4; 701/51; 701/61; 477/34; 477/37; 477/38; 477/39; 477/40

(58) Field of Classification Search
USPC .......... 701/31.4, 51, 61; 474/18, 28; 477/34, 477/37, 38, 39, 40, 44, 45, 46, 50, 62
See application file for complete search history.

(56) References Cited

U.S. PATENT DOCUMENTS

| | | | | |
|---|---|---|---|---|
| 5,016,174 A | * | 5/1991 | Ito et al. ........................... 701/62 |
| 5,184,528 A | * | 2/1993 | Mochizuki .................... 475/128 |
| 5,372,226 A | * | 12/1994 | Waterbury et al. ............. 192/3.3 |
| 5,573,475 A | * | 11/1996 | Sakakiyama et al. ........... 477/94 |
| 5,725,455 A | * | 3/1998 | Kamada et al. ................. 477/62 |
| 6,055,469 A | * | 4/2000 | Shoji et al. .................. 701/30.1 |
| 6,059,681 A | * | 5/2000 | Takiguchi ...................... 475/129 |
| 6,306,061 B1 | * | 10/2001 | Inamura et al. ................. 477/45 |

(Continued)

FOREIGN PATENT DOCUMENTS

| | | |
|---|---|---|
| JP | 10-246320 A | 9/1998 |
| JP | 11-280886 A | 10/1999 |

(Continued)

OTHER PUBLICATIONS

Office Action issued Aug. 16, 2011, in Japanese Patent Application No. 2009-237764 with Partial English translation.

*Primary Examiner* — Khoi Tran
*Assistant Examiner* — Jaime Figueroa
(74) *Attorney, Agent, or Firm* — Oblon, Spivak, McClelland, Maier & Neustadt, L.L.P.

(57) ABSTRACT

A control apparatus for a vehicular power transmitting apparatus includes a first valve that controls the supply of hydraulic fluid to a running clutch in connection with the switching of the operating state of a first solenoid valve; a second valve that controls the supply of hydraulic fluid to a lockup clutch in connection with the switching of the operating state of a second solenoid valve; and a linear solenoid valve that selectively controls the apply force of the running clutch and the lockup clutch according to the supply of control pressure to the first valve and the second valve. The control apparatus detects a failure state of a part related to the operation of the power transmitting apparatus by the operating state of the running clutch and the operating state of the lockup clutch.

18 Claims, 12 Drawing Sheets

(56) References Cited

U.S. PATENT DOCUMENTS

| | | | |
|---|---|---|---|
| 6,464,610 B1* | 10/2002 | Hisano et al. | 475/119 |
| 6,758,788 B2* | 7/2004 | Itou | 477/8 |
| 6,835,147 B2* | 12/2004 | Iwata et al. | 474/28 |
| 7,715,967 B2* | 5/2010 | Kim et al. | 701/53 |
| 2002/0117338 A1* | 8/2002 | Itou | 180/54.1 |
| 2003/0083169 A1* | 5/2003 | Iwata et al. | 475/208 |
| 2004/0063523 A1* | 4/2004 | Jozaki et al. | 474/18 |
| 2005/0064988 A1* | 3/2005 | Hasegawa et al. | 477/70 |
| 2005/0085340 A1* | 4/2005 | Ishikawa et al. | 477/41 |
| 2006/0149433 A1* | 7/2006 | Otsubo et al. | 701/29 |
| 2007/0161449 A1* | 7/2007 | Hayashi et al. | 475/130 |
| 2007/0167283 A1* | 7/2007 | Sato et al. | 477/156 |
| 2010/0056334 A1* | 3/2010 | Toi et al. | 477/158 |

FOREIGN PATENT DOCUMENTS

| | | |
|---|---|---|
| JP | 2004-190695 A | 7/2004 |
| JP | 2006-46568 A | 2/2006 |
| JP | 2007-113651 A | 5/2007 |
| JP | 4069054 | 1/2008 |
| JP | 2009-68520 A | 4/2009 |
| JP | 2009-92210 A | 4/2009 |
| JP | 2009-180320 A | 8/2009 |

* cited by examiner

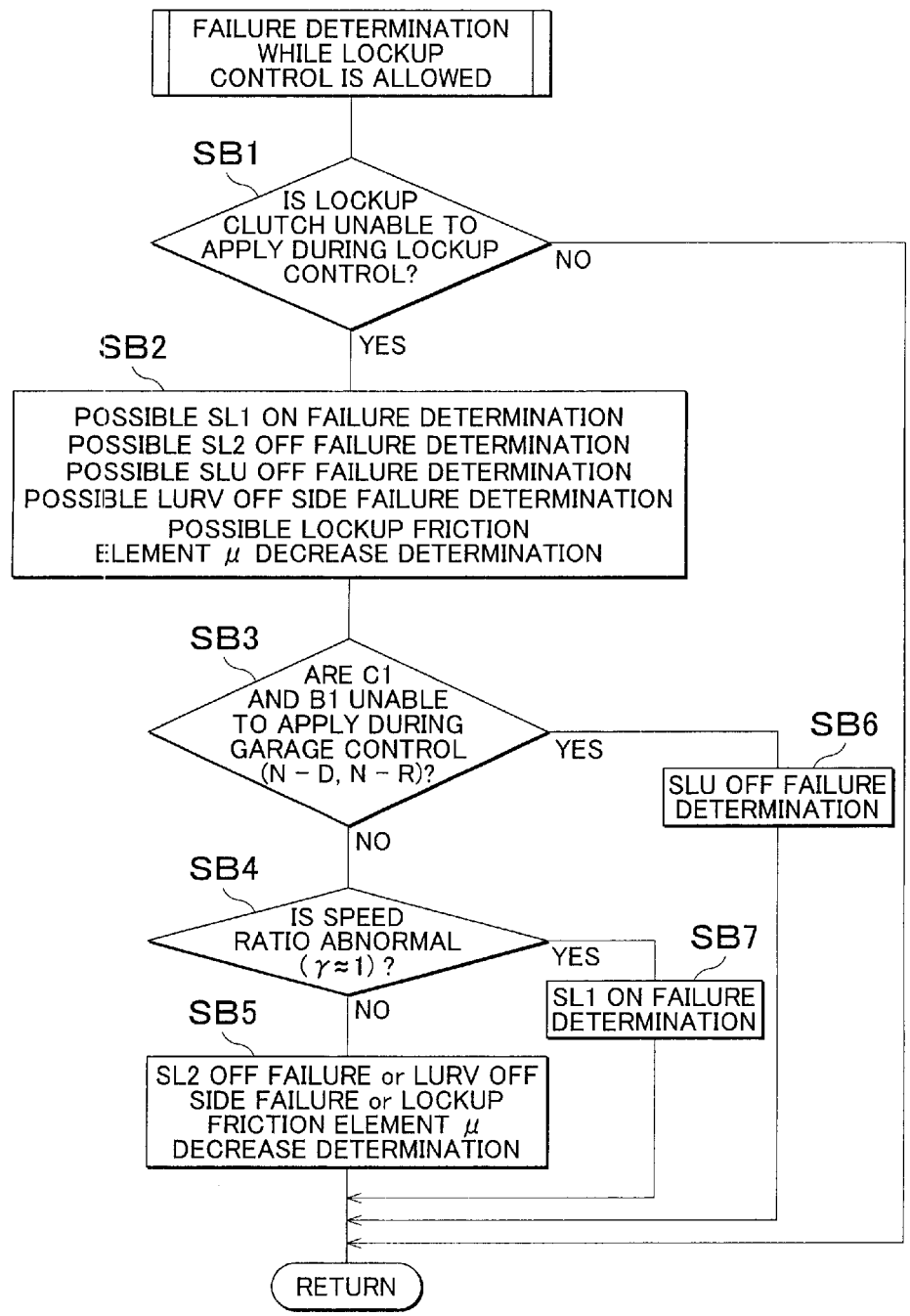

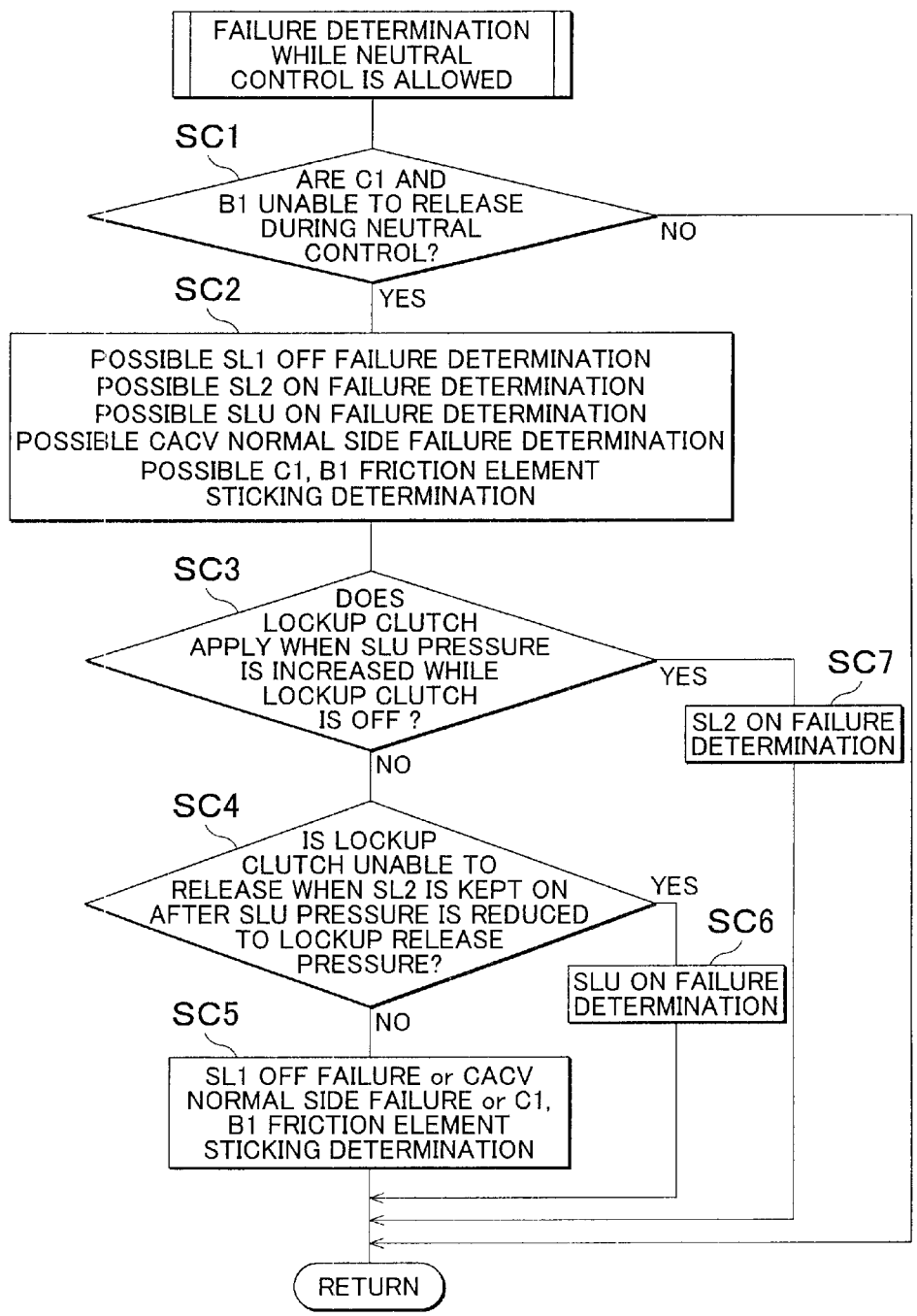

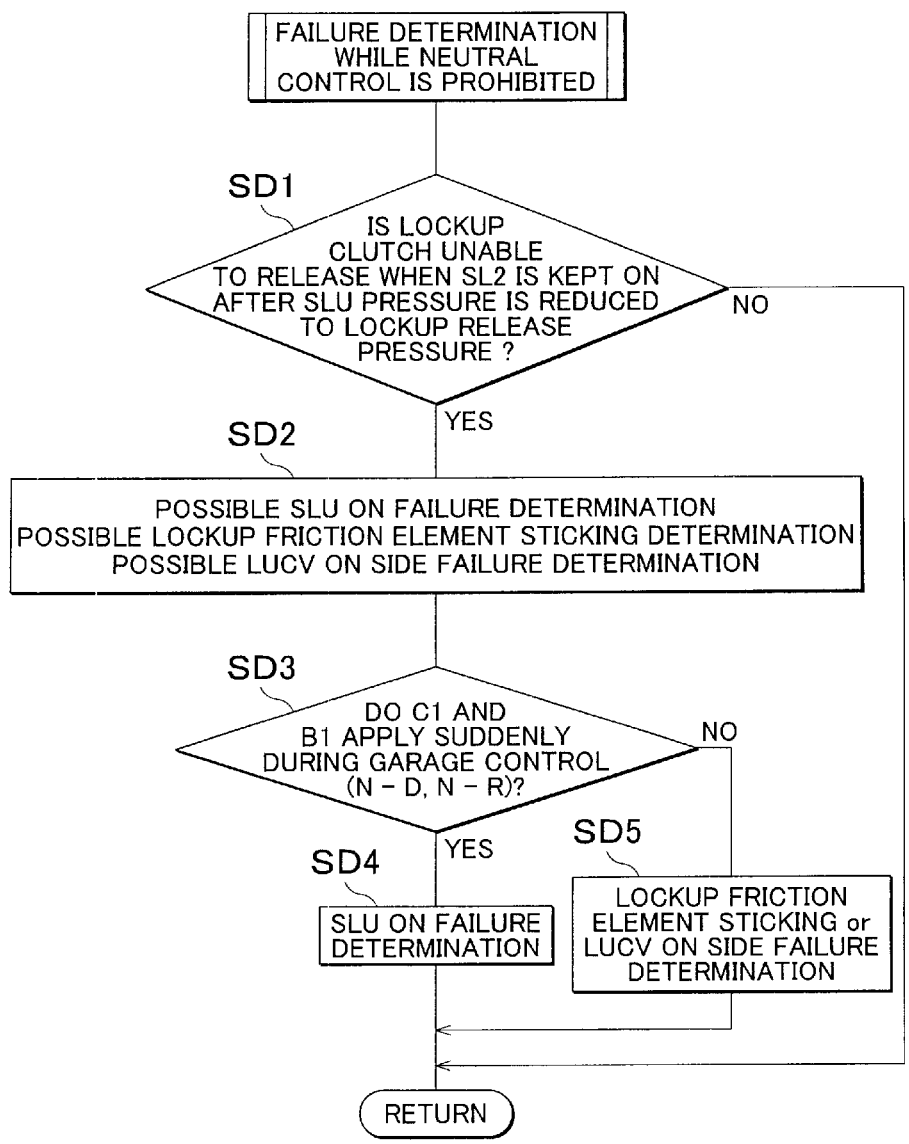

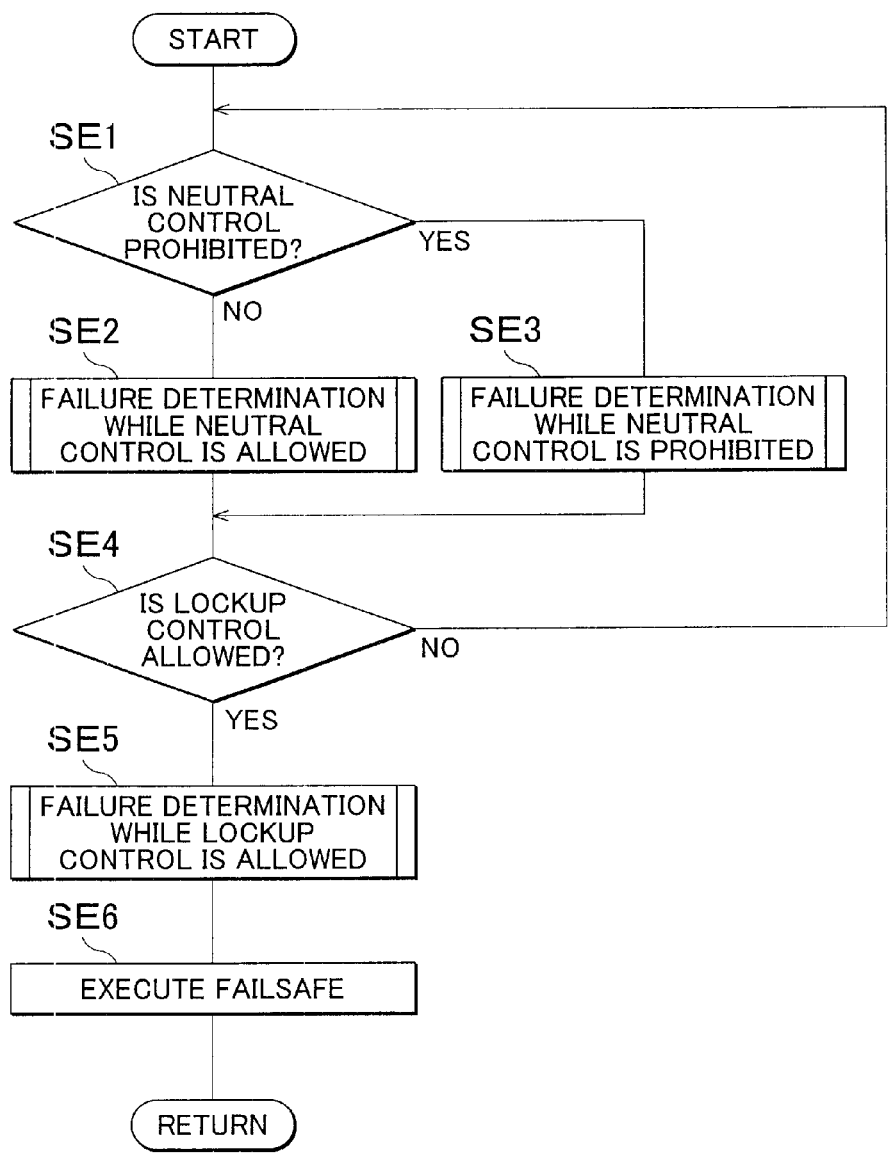

CONTROL APPARATUS FOR VEHICULAR POWER TRANSMITTING APPARATUS

INCORPORATION BY REFERENCE

The disclosure of Japanese Patent Application No. 2009-237764 filed on Oct. 14, 2009 including the specification, drawings and abstract is incorporated herein by reference in its entirety.

BACKGROUND OF THE INVENTION

1. Field of the Invention

The invention relates to a control apparatus for a vehicular power transmitting apparatus, and more particularly, to failure detection in that vehicular power transmitting apparatus.

2. Description of the Related Art

Clutches and brakes provided in a vehicular power transmitting apparatus are formed of hydraulic actuators driven by hydraulic pressure, and are controlled appropriately by a hydraulic control circuit. In this hydraulic control circuit there are a plurality of individual linear solenoid valves that are able to be electrically controlled. The apply force of the clutches and brakes is optimally controlled based on control pressure output from these linear solenoid valves. Incidentally, the unit price of such linear solenoid valves is relatively high, so reducing the number of these valves by even one is desirable in view of manufacturing costs. With respect to this, Japanese Patent No. 4069054 describes a hydraulic control apparatus of a power transmitting apparatus in which lockup control of a lockup clutch and control of a forward-reverse switching apparatus are performed using a single linear solenoid valve. Such a structure reduces the number of linear solenoid valves, and thus enables manufacturing costs to be kept down.

Incidentally, Japanese Patent No. 4069054 makes no mention of detecting a failure when some sort of abnormality occurs with the structure that performs both lockup control and clutch control with a single linear solenoid valve described in Japanese Patent No. 4069054. Therefore, with the structure described in Japanese Patent No. 4069054, an oil pressure switch and a hydraulic sensor for detecting a failure of the linear solenoid valve are necessary, and as a result, the hydraulic control circuit becomes complex. In addition, a system is necessary for successively detecting failures in the oil pressure switch and hydraulic sensor themselves, which ends up increasing development man-hours.

SUMMARY OF INVENTION

The invention therefore provides a control apparatus for a vehicular power transmitting apparatus capable of detecting a failure without providing failure detecting means, such as an oil pressure switch, in a control apparatus for a vehicular power transmitting apparatus capable of performing clutch control and lockup control with a single linear solenoid valve.

A first aspect of the invention relates to a control apparatus for a vehicular power transmitting apparatus that includes a first valve that controls the supply of hydraulic fluid to a running clutch in connection with the switching of the operating state of a first solenoid valve; a second valve that controls the supply of hydraulic fluid to a lockup clutch in connection with the switching of the operating state of a second solenoid valve; and a linear solenoid valve that selectively controls the apply force of the running clutch and the lockup clutch according to the supply of control pressure to the first valve and the second valve. The control apparatus detects a failure state of a part related to the operation of the power transmitting apparatus by the operating state of the running clutch and the operating state of the lockup clutch.

With the control apparatus for a vehicular power transmitting apparatus according to the aspect described above, the failure state of a part is detected based on the operating state of the running clutch and the operating state of the lockup clutch. Therefore, the failure state of a part can be detected without providing a hydraulic sensor and an oil pressure switch or the like for detecting a failure. That is, failure detecting performance can be ensured without increasing the number of parts and making the structure more complex.

BRIEF DESCRIPTION OF DRAWINGS

The foregoing and/or further objects, features and advantages of the invention will become more apparent from the following description of example embodiments with reference to the accompanying drawings, in which like numerals are used to represent like elements and wherein:

FIG. 9 is a flowchart illustrating a control operation executed when lockup control of the lockup clutch is allowed in FIG. 8, according to the example embodiment of the invention;

FIG. 10 is a flowchart illustrating a control operation executed when neutral control is allowed in FIG. 8, according to the example embodiment of the invention;

FIG. 11 is a flowchart illustrating a control operation executed when neutral control is prohibited in FIG. 8, according to the example embodiment of the invention; and FIG. 12 is another flowchart illustrating the main parts of a control operation of the electronic control unit, which corresponds to the flowchart in FIG. 8, according to the example embodiment of the invention.

DETAILED DESCRIPTION OF EMBODIMENTS

In an example embodiment of the invention, an on failure of the first solenoid valve, the second solenoid valve, and the linear solenoid valve corresponds to a failure in which hydraulic pressure is constantly output from each of those electromagnetic valves. Also, an off failure of the first solenoid valve, the second solenoid valve, and the linear solenoid valve corresponds to a failure in which hydraulic pressure is not output despite a command being output to output hydraulic pressure from each of those electromagnetic valves.

Also, in the example embodiments of the invention, the transmission corresponds to a belt-type continuously variable transmission. Therefore, the direction in which the vehicle travels can be appropriately switched by the running clutch.

Hereinafter, example embodiments of the invention will be described in detail with reference to the accompanying drawings. Incidentally, the drawings described in the example embodiments below have been simplified or modified as appropriate, so the scale ratios and the shapes and the like of the portions are not always accurately depicted.

Figure 1:
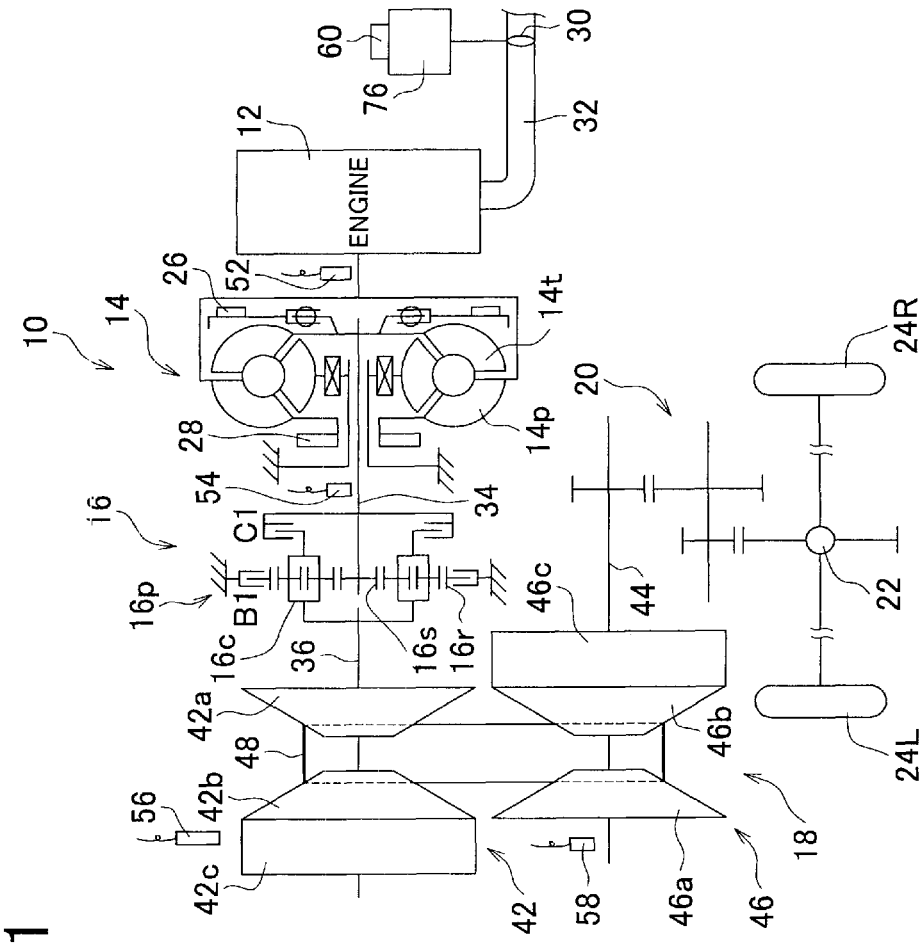
FIG. 1 is a skeleton view of the structure of a vehicular power transmitting apparatus according to an example embodiment of the invention.

FIG. 1 is a skeleton view of the structure of a vehicular power transmitting apparatus 10 to which the invention has been applied. This vehicular power transmitting apparatus 10 is a transverse mounted automatic transmission that is preferably used in a FF (front engine-front drive) vehicle, and includes an engine 12 as a driving source for running. The output of the engine 12 that is formed by an internal combustion engine is transmitted from a torque converter 14 that serves as a fluid power transmitting device to a differential gear unit 22 via a front-reverse switching apparatus 16, a belt-type continuously variable transmission (CVT) 18, and reduction gears 20, and then distributed to left and right driving wheels 24L and 24R.

The torque converter 14 includes a pump impeller 14p that is connected to a crankshaft of the engine 12, and a turbine runner 14t that is connected to the front-reverse switching apparatus 16 via a turbine shaft 34 that corresponds to an output side member of the torque converter 14, and transmits power via fluid. Also, a lockup clutch 26 is provided between the pump impeller 14p and the turbine runner 14t. This lockup clutch 26 is structured so as to be applied or released by the supply of hydraulic pressure with respect to an apply-side fluid chamber and a release-side fluid chamber being switched by a lockup control valve 106 and the like inside a hydraulic control circuit 100 (see FIG. 3). Completely applying the lockup clutch 26 causes the pump impeller 14p and the turbine runner 14t to rotate together as a single unit. Also, a mechanical oil pump 28 that generates hydraulic pressure for executing belt squeezing force control and shift control in the CVT 18 and apply and release control of the lockup clutch 26 and the like is connected to the pump impeller 14p. This oil pump 28 operates in conjunction with the rotation of the engine.

The front-reverse switching apparatus 16 has, as its main components, a forward clutch C1, a reverse brake B1, and a double pinion type planetary gear set 16p. The turbine shaft 34 of the torque converter 14 is integrally connected to a sun gear 16s and an input shaft 36 of the CVT 18 is integrally connected to a carrier 16c. The carrier 16c and the sun gear 16s are able to be selectively coupled together via the forward clutch C1, and a ring gear 16r is able to be selectively held (i.e., fixed) to a housing via the reverse brake B1. The forward clutch C1 and the reverse brake B1 are both hydraulic type friction apply devices that are frictionally applied by hydraulic actuators. Incidentally, both the forward clutch C1 and the reverse brake B1 correspond to the running clutch of the invention.

When the forward clutch C1 is applied and the reverse brake B1 is released, the front-reverse switching apparatus 16 is placed in a direct-drive state in which the front-reverse switching apparatus 16 rotates as a single unit, such that the turbine shaft 34 is directly coupled with the input shaft 36. As a result, a forward power transmitting path is established (i.e., achieved), such that driving force in the forward direction is transmitted to the CVT 18 side. Also, when the reverse brake B1 is applied and the forward clutch C1 is released, a reverse power transmitting path is established (i.e., achieved) in the front-reverse switching apparatus 16, in which the input shaft 36 rotates in the opposite direction of the turbine shaft 34, such that driving force in the reverse direction is transmitted to the CVT 18 side. Also, when both the forward clutch C1 and the reverse brake B1 are released, the front-reverse switching apparatus 16 is placed in a neutral state in which the transmission of power is interrupted (i.e., a power transmission interrupted state).

The CVT 18 includes a driving side pulley (i.e., a primary pulley or primary sheave) 42 having a variable effective radius, that serves as an input side member and is provided on the input shaft 36, a driven side pulley (i.e., a secondary pulley or secondary sheave) 46 having a variable effective radius, that serves as an output side member and is provided on the output shaft 44, and a drive belt 48 that is wound around these variable pulleys 42 and 46. Power is transmitted via friction force between the drive belt 48 and the variable pulleys 42 and 46.

The variable pulley 42 includes a fixed rotating body 42a that is fixed to the input shaft 36, a movable rotating body 42b that is provided on the input shaft 36 in a manner such that it is able to move in the axial direction of the input shaft 36 but unable to rotate relative to the input shaft 36, and a driving side hydraulic actuator (i.e., a primary pulley side hydraulic actuator) 42c that serves as a hydraulic actuator that applies thrust to change a V groove width between the fixed rotating body 42a and the movable rotating body 42b. Similarly, the variable pulley 46 includes a fixed rotating body 46a that is fixed to the output shaft 44, a movable rotating body 46b that is provided on the output shaft 44 in a manner such that it is able to move in the axial direction of the output shaft 44 but unable to rotate relative to the output shaft 44, and a driven side hydraulic actuator (i.e., a secondary pulley side hydraulic actuator) 46c that serves as a hydraulic actuator that applies thrust to change a V groove width between the fixed rotating body 46a and the movable rotating body 46b. The V groove widths of the movable pulleys 42 and 46 are changed by the hydraulic pressure of the hydraulic fluid to the driving side hydraulic actuator 42c being controlled by the hydraulic control circuit 100. As these V groove widths of the movable pulleys change, so too does the winding radius (i.e., the effective radius) of the drive belt 48, so the speed ratio γ(=input shaft rotation speed Nin/output shaft rotation speed Nout) is able to be changed in a continuous (i.e., stepless) manner.

Figure 2:
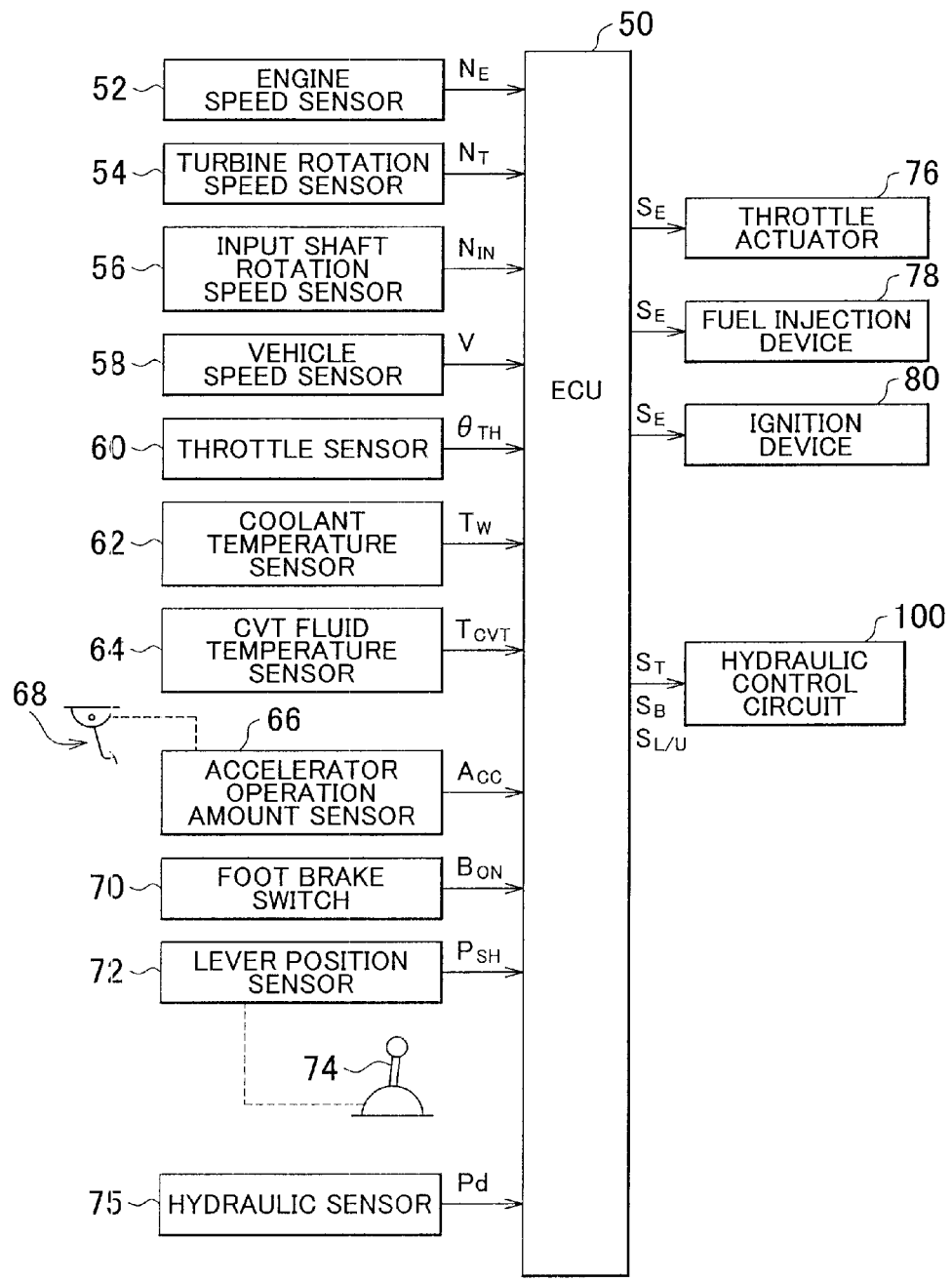
FIG. 2 is a block line diagram of the main portions of a control system provided in a vehicle for controlling a vehicle drive system and the like shown in FIG. 1, according to the example embodiment of the invention.

FIG. 2 is a block line diagram of the main portions of a control system provided in the vehicle for controlling the vehicular power transmitting apparatus 10 and the like shown in FIG. 1. An electronic control unit (ECU) 50 is formed, for example, by a so-called microcomputer that has a CPU, RAM, ROM, and an input/output interface and the like. The CPU executes various types of control, such as output control of the engine 12, belt squeezing force control and shift control in the CVT 18, and torque capacity control of the lockup clutch 26, by performing signal processing according to programs stored in advance in the ROM, while using the temporary storage function of the RAM. When necessary, the CPU may be structured such that the portion for engine control is separate from the portion for hydraulic control of the CVT 18 and the lockup clutch 26.

Various signals are supplied to the ECU 50. Some examples of these signals include a signal indicative of a crankshaft rotation speed that corresponds to the speed (i.e., the engine speed) Ne of the engine 12 and a crankshaft rotation angle (position) $A_{CR}$ (°) detected by an engine speed sensor 52, a signal indicative of the rotation speed (i.e., the turbine rotation speed) Nt of the turbine shaft 34 detected by a turbine rotation speed sensor 54, a signal indicative of the rotation speed (i.e., the input shaft rotation speed) Nin of the input shaft 36 that is the input rotation speed of the CVT 18 detected by an input shaft rotation speed sensor 56, a vehicle speed signal indicative of the rotation speed (i.e., the output shaft rotation speed) Nout of the output shaft 44 that is the output rotation speed of the CVT 18 detected by a vehicle speed sensor (i.e., an output shaft rotation speed sensor) 58, i.e., indicative of the vehicle speed V that corresponds to the output shaft rotation speed Nout, a throttle valve opening amount signal indicative of a throttle valve opening amount $\theta_{TH}$ of an electronic throttle valve 30 provided in an intake conduit 32 (see FIG. 1) of the engine 12 detected by a throttle sensor 60, and a signal indicative of the coolant temperature $T_W$ of the engine 12 detected by a coolant temperature sensor 62. Other examples of signals that are supplied to the ECU 50 include a signal indicative of the fluid temperature $T_{CVT}$ of a hydraulic circuit of the CVT 18 and tie like detected by a CVT fluid temperature sensor 64, an accelerator operation amount signal indicative of an accelerator operation amount Acc that is the operation amount of an accelerator pedal 68 detected by an accelerator operation amount sensor 66, a brake operation signal indicative of an operation $B_{ON}$ of a foot brake that is a service brake detected by a footbrake switch 70, an operating position signal indicative of a lever position (i.e., operating position) $P_{SH}$ of a shift lever 74 detected by a lever position sensor 72, and a belt squeezing force signal indicative of belt squeezing pressure Pd of the driven side hydraulic actuator 46c detected by a hydraulic sensor 75.

Also, the ECU 50 outputs engine output control command signals $S_E$ for controlling the output of the engine 12, such as a throttle signal that drives a throttle actuator 76 for controlling the opening and closing of the electronic throttle valve 30, an injection signal to control the quantity of fuel injected from a fuel injection device 78, and an ignition timing signal for controlling the ignition timing of the engine 12 by an ignition device 80. The ECU 50 also outputs various signals to the hydraulic control circuit 100, such as a shift control command signal $S_T$ for changing the speed ratio γ of the CVT 18, a squeezing force control command signal $S_B$ for adjusting the squeezing force of the drive belt 48, a lockup control command signal $S_{LU}$ for controlling the application, release, and slip amount of the lockup clutch 26, as well as, for example, a command signal for driving a solenoid valve, which will be described later, that switches the valve position of a lockup relay valve in the hydraulic control circuit 100, a command signal for driving a linear solenoid valve that adjusts the apply force of the lockup clutch 26, a signal for releasing or partially applying the forward clutch C1 or the reverse brake B1 during neutral control, and a signal for adjusting the apply pressure of the forward clutch C1 or the reverse brake B1 during a garage shift.

The shift lever 74 is arranged near the driver's seat, for example, and is manually operated into any one of five successively positioned lever positions, which are "P", "R", "N", "D", and "L".

The "P" position (range) is a parking position for placing the vehicular power transmitting apparatus 10 in a neutral state in which the power transmitting path in the vehicular power transmitting apparatus 10 is disconnected, i.e., in which the transmission of power in the vehicular power transmitting apparatus 10 is interrupted, and mechanically preventing the output shaft 44 from rotating (i.e., mechanically locking the output shaft 44 against rotation) by a mechanical parking mechanism. The "R" position is a reverse running position for reversing the rotational direction of the output shaft 44. The "N" position is a neutral position for placing the vehicular power transmitting apparatus 10 in a neutral state in which the transmission of power in the vehicular power transmitting apparatus 10 is interrupted. The "D" position is a forward running position that executes automatic shift control by establishing an automatic shift mode within a range where shifting in the CVT 18 is allowed. The "L" position is an engine brake position in which a strong engine brake is applied. In this way, the "P" position and the "N" position are both non-running positions that place the power transmitting path in a neutral state and are selected when the vehicle is not to be run. The "R" position, the "D" position, and the "L" position are all running positions that place the power transmitting path in a power transmission possible state in which power is able to be transmitted along the power transmitting path and are selected when the vehicle is to be run.

Figure 3:
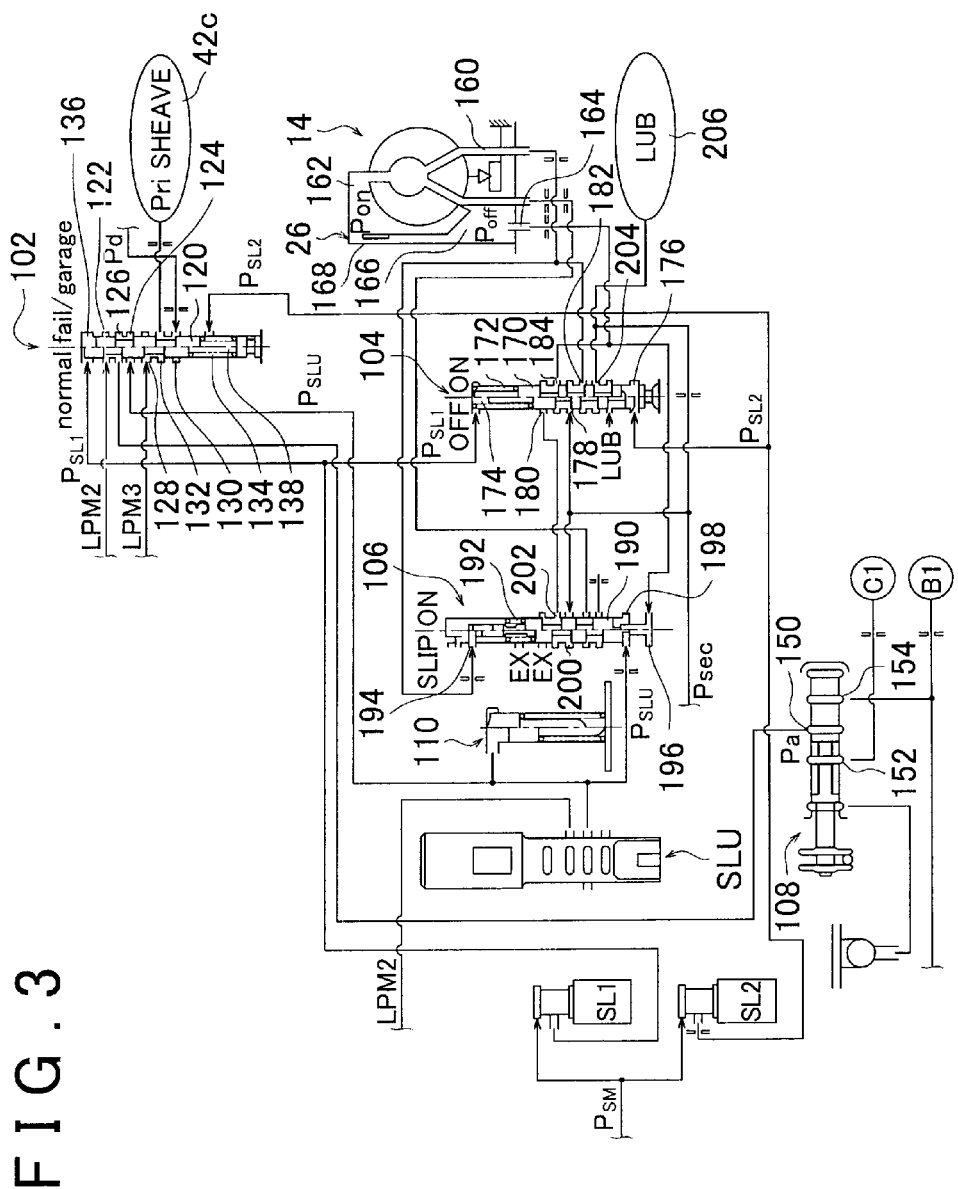
FIG. 3 is a hydraulic circuit diagram showing the main portions related to lockup control of a lockup clutch and apply-pressure control of a forward clutch and a reverse brake according to an operation of a shift lever, in a hydraulic control circuit that controls the vehicular power transmitting apparatus shown in FIG. 1, according to the example embodiment of the invention.

FIG. 3 is a hydraulic circuit diagram of the main portions related to lockup control of the lockup clutch 26 and apply-pressure control of the forward clutch C1 and the reverse brake B1 following an operation of the shift lever 74, in the hydraulic control circuit 100. In FIG. 3, the hydraulic control circuit 100 includes a first switching valve SL1, a second switching valve SL2, a clutch apply control valve 102, a lockup relay valve 104, a linear solenoid valve SLU, a lockup control valve 106, a manual valve 108, and a SLU damper 110 and the like. The first switching valve SL1 outputs a switching pressure $P_{SL1}$ with a modulator pressure $P_{SM}$ supplied from a pressure regulating valve, not shown, as the base pressure. The second switching valve SL2 outputs a switching pressure $P_{SL2}$ with a modulator pressure $P_{SM}$ supplied from a pressure regulating valve, not shown, as the base pressure. The clutch apply control valve 102 switches the hydraulic fluid supplied to the forward clutch C1 and the reverse brake B1 according to the output states of the first switching valve SL1 and the second switching valve SL2. The lockup relay valve 104 selectively switches between a release position (i.e., an off position) that places the lockup clutch 26 in a released state and an apply position (i.e., an on position) that places the lockup clutch 26 in an applied state, according to the output states of the first switching valve SL1 and the second switching valve SL2. The linear solenoid valve SLU outputs a control pressure $P_{SLU}$ that corresponds to the driving current supplied from the ECU 50. The lockup control valve 106 controls the apply force of the lockup clutch 26 according to the control pressure $P_{SLU}$ of the linear solenoid valve SLU while the lockup relay valve 104 is switched to the apply position. The manual valve 108 mechanically switches the fluid path according to an operation of the shift lever 74 such that the forward clutch C1 and the reverse brake B1 selectively apply or release. The SLU damper 110 absorbs pulsations of the control pressure $P_{SLU}$ of the linear solenoid valve SLU. Incidentally, the clutch apply control valve 102 corresponds to the first valve of the invention, the lockup control valve 106 corresponds to the second valve of the invention, the first switching valve SL1 corresponds to the first solenoid valve of the invention, the second switching valve SL2 corresponds to the second solenoid valve of the invention, and the linear solenoid valve SLU corresponds to the linear solenoid valve of the invention.

The clutch apply control valve 102 functions as a switching valve that switches the supply state of the hydraulic fluid that is supplied to the forward clutch C1 and the reverse brake B1 via the manual valve 108. The clutch apply control valve 102 includes a spool valve body 120, a first input port 122, a second input port 124, a first output port 126, a third input port 128, a fourth input port 130, a second output port 132, a spring 134, a fluid chamber 136, and a fluid chamber 138. The spool valve body 120 is placed in either a normal position (the left side of the drawing of the clutch apply control valve 102 in FIG. 3) that outputs the hydraulic fluid to be supplied to the forward clutch C1 and the reverse brake B1 at a constant modulator pressure LPM2 to which that hydraulic fluid has been regulated by a pressure regulating valve, not shown, or a fail/garage position (the right side of the drawing of the clutch apply control valve 102 in FIG. 3) that outputs hydraulic fluid to be supplied to the forward clutch C1 and the reverse brake B1 at the control pressure $P_{SLU}$ of the linear solenoid valve SLU, by being moved in the axial direction. The first input port 122 receives the constant modulator pressure LPM2 to which hydraulic fluid has been regulated by the pressure regulating valve, not shown. The second input port 124 receives the control pressure $P_{SLU}$ of the linear solenoid valve SLU. The first output port 126 is connected to an input port 150 of the manual valve 108 and is communicated with either the first input port 122 or the second input pert 124 depending on the switching position of the spool valve body 120. The third input port 128 receives a control pressure LPM3 to which hydraulic fluid has been regulated by a pressure regulating valve, not shown. The fourth input port 130 receives hydraulic pressure Pd of the driven side hydraulic actuator 46c. The second output port 132 is connected to the driving side hydraulic actuator 42c and is communicated with either the third input port 128 or the fourth input port 130 depending on the switching position of the spool valve body 120. The spring 134 continuously urges the spool valve body 120 to the normal position side. The fluid chamber 136 receives switching pressure $P_{SL1}$ for applying thrust to the spool valve body 120 toward the fail/garage position side. The fluid chamber 138 receives switching pressure $P_{SL2}$ for applying thrust to the spool valve body 120 toward the normal position side.

For example, when the switching pressure $P_{SL1}$ of the first switching valve SL1 is supplied to the fluid chamber 136, the spool valve body 120 moves to the fail/garage position side (i.e., the right side in the drawing) against the urging force of the spring 134. At this time, the second input port 124 is communicated with the first output port 126, so the control pressure $P_{SLU}$ of the linear solenoid valve SLU is supplied to the input port 150 of the manual valve 108. Also, the fourth input port 130 is communicated with the second output port 132, so the hydraulic pressure Pd of the driven side hydraulic actuator 46c is supplied to the driving side hydraulic actuator 42c.

On the other hand, when the switching pressure $P_{SL2}$ of the second switching valve SL2 is supplied to the fluid chamber 138, the spool valve body 120 moves to the normal position side (i.e., the left side in the drawing). At this time, the first input port 122 is communicated with the first output port 126, such that the modulator pressure LPM2 is supplied to the input port 150 of the manual valve 108. Also, the third input port 128 is communicated with the second output port 132, so the control pressure LPM3 is supplied to the driving side hydraulic actuator 42c.

In the manual valve 108, apply pressure Pa (either the control pressure $P_{SLU}$ or the modulator pressure LPM2) that has been output from the first output port 126 of the clutch apply control valve 102 is supplied to the input port 150. Then when the shift lever 74 is operated into the "D" position or the "L" position, the apply pressure Pa is supplied to the forward clutch C1 via a forward output port 152, such that the forward clutch C1 applies. Also, when the shift lever 74 is operated into the "R" position, the apply pressure Pa is supplied to the reverse brake B1 via a reverse output port 154, such that the reverse brake B1 applies. Further, when the shift lever 74 is operated into the "P" position and the "N" position, the fluid paths from the input port 150 to the forward output port 152 and the reverse output port 154 are both interrupted, so both the forward clutch C1 and the reverse brake B1 release.

The lockup clutch 26 of the torque converter 14 is a hydraulic type friction clutch in which friction is applied to a front cover 168 by the differential pressure $\Delta P(=Pon-Poff)$ between the hydraulic pressure Pon inside an apply side fluid chamber 162 that is supplied via an apply side fluid passage 160, and hydraulic pressure Poff inside a release side fluid chamber 166 that is supplied via a release side fluid passage 164. Also, there are, for example, three main operating states of the torque converter 14. These three states are i) a so-called lockup off state in which the differential pressure $\Delta P$ is negative and the lockup clutch 26 is released, ii) a so-called slip state in which the differential pressure $\Delta P$ is equal to or greater than zero and the lockup clutch 26 is partially applied, and iii) a so-called lockup on state in which the differential pressure $\Delta P$ is the maximum value and the lockup clutch 26 is completely applied. Also, in the slip state of the lockup clutch 26, the differential pressure $\Delta P$ is zero so there is no torque load placed on the lockup clutch 26, and as a result, the torque converter 14 is in an operating state similar to the lockup off state.

The lockup relay valve 104 includes a spool valve body 170, a spring 172, a fluid chamber 174, a fluid chamber 176, an input port 178, a bypass port 180, an apply side port 182, and a release side port 184. The spool valve body 170 is switched between an apply position of the lockup clutch 26 (i.e., an ON position; the right side of the drawing of the lockup relay valve 104 in FIG. 3) and a release position of the lockup clutch 26 (i.e., an OFF position; the left side of the drawing of the lockup relay valve 104 in FIG. 3). The spring 172 is provided on one axial end side of the spool valve body 170 and applies thrust to the spool valve body 170 toward the release position (i.e., the OFF position). The fluid chamber 174 receives the switching pressure $P_{SL1}$ of the first switching valve SL1 for moving the spool valve body 170 toward the release position (i.e., the OFF position) side. The fluid chamber 176 receives the switching pressure $P_{SL2}$ of the second switching valve SL2 for moving the spool valve body 170 toward the apply position (i.e., the ON position) side. The input port 178 receives secondary pressure Psec to which hydraulic pressure has been regulated by a second regulator valve, not shown. The bypass port 180 is communicated with a control port 202 of the lockup control valve 106. The apply side port 182 is communicated with the apply side fluid passage 160. The release side port 184 is communicated with the release side fluid passage 164.

The lockup control valve 106 includes a spool valve body 190, a spring 192, a fluid chamber 194, a fluid chamber 196, a fluid chamber 198, an input port 200, and the control port 202. The spool valve body 190 is switched to either a slip position (SLIP position) that places the lockup clutch 26 in the partially applied state, or a complete apply position (ON position) that places the lockup clutch 26 in a completely applied state. The spring 192 applies thrust to the spool valve body 190 toward the slip position (SLIP position) side. The fluid chamber 194 receives the hydraulic pressure Pon in the apply side fluid chamber 162 of the torque converter 14 in order to urge the spool valve body 190 toward the slip position side. The fluid chamber 196 receives the hydraulic pressure Poff in the release side fluid chamber 166 of the torque converter 14 to urge the spool valve body 190 toward the complete apply position (ON position) side. The fluid chamber 198 receives control pressure $P_{SLU}$ to urge the spool valve body 190 toward the complete apply position side. The input port 200 receives the secondary pressure Psec. The control port 202 is communicated with the bypass port 180 of the lockup relay valve 104.

Figure 4:
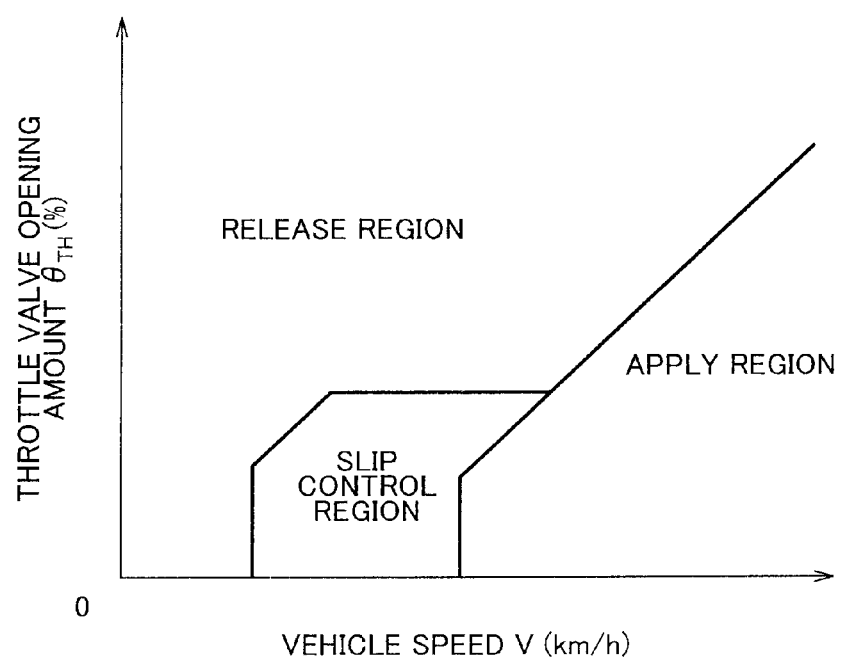
FIG. 4 is a relationship diagram (i.e., a map or region line diagram) showing a release region (i.e., a lockup off region), a slip control region, and an apply region (i.e., a lockup on region) of a lockup clutch, with the throttle valve opening amount and the vehicle speed as variables, according to the example embodiment of the invention.

The supply state of hydraulic pressure to the apply side fluid chamber 140 and a release side fluid chamber 144 is switched, and thus the operating state of the lockup clutch 26 is switched, by the lockup relay valve 104 and the lockup control valve 106 structured as described above. More specifically, the ECU 50 is functionally provided with lockup clutch controlling means for controlling the switching of the operating state of the lockup clutch 26 based on the actual vehicle state, such as the throttle valve opening amount $\theta_{TH}$ and the vehicle speed V, from a pre-stored relationship (i.e., a map or lockup region line graph) that has a release (lockup off) region, a slip control region, and an apply (lockup on) region, with the throttle valve opening amount $\theta_{TH}$ and the vehicle speed V as variables, as shown in FIG. 4, for example. The operating state of the lockup clutch 26 is switched based on this relationship.

First, a case in which the lockup clutch 26 is switched to the slip state, including the release state, through the lockup on state will be described. In the lockup relay valve 104, switching pressure $P_{SL2}$ of the second switching valve SL2 is supplied to the fluid chamber 176 such that the spool valve body 170 moves to the apply position (i.e., the ON position). The secondary pressure Psec supplied to the input port 178 is then supplied from the apply side port 182 to the apply side fluid chamber 162 through the apply side fluid passage 160. The secondary pressure Psec supplied to this apply side fluid chamber 162 becomes the hydraulic pressure Pon. At the same time, the release side fluid chamber 166 is communicated with the control port 202 of the lockup control valve 106 via the release side fluid passage 164, the release side port 184, and the bypass port 180, in that order. Then, as the hydraulic pressure Poff of the release side fluid chamber 166 is adjusted by the lockup control valve 106, the differential pressure $\Delta P(=Pon-Poff)$ becomes adjusted, such that the operating state of the lockup clutch 26 is switched within the range between the slip state and the lockup on state.

More specifically, when the spool valve body 170 of the lockup relay valve 104 is urged into the apply position (i.e., the ON position), i.e., when the lockup clutch 26 is switched to the applied state, and, in the lockup control valve 106, the control pressure $P_{SLU}$ for urging the spool valve body 190 into the complete apply position (i.e., the ON position) is not supplied to the fluid chamber 198 such that the spool valve body 190 is placed in the slip position (i.e., the SLIP position) by the thrust of the spring 192, the secondary pressure Psec that has been supplied to the input port 200 is supplied from the control port 202 to the release side fluid passage 164 via the bypass port 180, the release side port 184, and a release side fluid passage 142, in that order. As a result, the differential pressure $\Delta P$ becomes zero because the hydraulic pressure Pon and the hydraulic pressure Poff are the same pressure, so even if the lockup relay valve 104 has been switched to the apply position, the lockup clutch 26 is in a state that is equivalent to the lockup off state.

Also, when the spool valve body 170 of the lockup relay valve 104 is being urged to the apply position (i.e., the ON position), and, in the lockup control valve 106, a preset control pressure $P_{SLU}$ for urging the spool valve body 190 into the complete apply position (i.e., the ON position) is supplied to the fluid chamber 198 (i.e., in the lockup on state) such that the spool valve body 190 is urged to the complete apply position, the fluid path from the input port 200 to the control port 202 is interrupted so the secondary pressure Psec is not supplied to the release side fluid chamber 166, and the hydraulic fluid in the release side fluid chamber 166 is discharged from a drain port EX via the control port 202. As a result, the hydraulic pressure Poff is zero so the differential pressure $\Delta P$ becomes the maximum value, such that the lockup clutch 26 is placed in the lockup on state.

Also, when the spool valve body 170 of the lockup relay valve 104 is being urged to the apply position (i.e., the ON position), and, in the lockup control valve 106, a preset control pressure $P_{SLU}$ for positioning the spool valve body 190 between the slip position (i.e., the SLIP position) and the complete apply position (i.e., the ON position) is supplied to the fluid chamber 198, the state in which the secondary pressure Psec that has been supplied to the input port 200 to the release side fluid chamber 166 via the control port 202 and the state in which the hydraulic fluid in the release side fluid chamber 166 is discharged from the drain port EX via the control port 202 are adjusted based on the control pressure $P_{SLU}$. That is, the hydraulic pressure Poff is regulated by the lockup control valve 106 based on the control pressure $P_{SLU}$ such that the rotation speed difference $N_{SLP}$ (Ne−Nt) of the lockup clutch 26 comes to match a target rotation speed difference $N_{SLP}^*$.

Next, a case in which the lockup clutch 26 is switched to a released state will be described. In the lockup relay valve 104, when the switching pressure $P_{SL2}$ is not supplied to the fluid chamber 176 and the switching pressure $P_{SL1}$ is supplied to the fluid chamber 174, the switching pressure $P_{SL1}$ and the urging force of the spring 172 moves the spool valve body 170 into the release position (i.e., the OFF position). As a result, the secondary pressure Psec that has been supplied to the input port 178 is supplied from the release side port 184 to the release side fluid chamber 166 through the release side fluid passage 164 of the torque converter 14. Then the hydraulic fluid that has been discharged to the apply side port 182 through the apply side fluid passage 160 of the torque converter 14 via the apply side fluid chamber 162 is supplied from a discharge port 204 to a lubricating circuit 206. As a result, the differential pressure $\Delta P$ becomes negative so the lockup clutch 26 is placed in the lockup off state.

Here, in the hydraulic control circuit 100, the control pressure $P_{SLU}$ of the linear solenoid valve SLU is used to control the differential pressure $\Delta P$ of the lockup clutch 26, as well as to control the apply pressure supplied to the forward clutch C1 and the reverse brake B1, as described above. More specifically, in the clutch apply control valve 102, the spool valve body 120 moves to the fail/garage position while the switching pressure $P_{SL1}$ is output from the first switching valve SL1 and the switching pressure $P_{SL2}$ is not output from the second switching valve SL2. Incidentally, this fail/garage position is a position that is switched to when some sort of failure occurs in the vehicle or during garage control that is executed when the shift lever 74 is switched from the "N" position into one of the "D", the "R", or the "L" positions. In this state, the control pressure $P_{SLU}$ of the linear solenoid valve SLU is supplied from the second input port 124 to the input port 150 of the manual valve 108 via the first output port 126. Also, that control pressure $P_{SLU}$ is supplied to one of the forward clutch C1 or the reverse brake B1, and the forward clutch C1 or the reverse brake B1 is applied smoothly based on that control pressure $P_{SLU}$. Also, the speed ratio γ is adjusted to a preset speed ratio γa by the hydraulic pressure Pd of the driven side hydraulic actuator 46c being supplied to the driving side hydraulic actuator 42c.

At this time, in the lockup relay valve 104, the spool valve body 170 is switched to the release position (i.e., the OFF position) in response to the switching pressure $P_{SL1}$ of the first switching valve SL1 being supplied to the fluid chamber 174, so the bypass port 180 of the lockup relay valve 104 is blocked off. Therefore, the lockup relay valve 104 and the lockup control valve 106 are in interrupted states, so the lockup clutch 26 will not be affected even if the control pressure $P_{SLU}$ of the linear solenoid valve SLU is supplied to the fluid chamber 198. Accordingly, while the switching pressure $P_{SL1}$ is output from the first switching valve SL1, the control pressure $P_{SLU}$ of the linear solenoid valve SLU becomes the apply pressure of the forward clutch C1 and the reverse brake B1.

On the other hand, while the switching pressure $P_{SL1}$ is not output from the first switching valve SL1 and the switching pressure $P_{SL2}$ is output from the second switching valve SL2, the spool valve body 170 of the lockup relay valve 104 is placed in the apply position (i.e., the ON position). In this state, the spool valve body 190 is controlled within a range from the SLIP position to the ON position, such that the apply state (i.e., the slip state) of the lockup clutch 26 is controlled, by the control pressure $P_{SLU}$ of the linear solenoid valve SLU being supplied to the fluid chamber 198 of the lockup control valve 106, as described above. At this time, in the clutch apply control valve 102, the spool valve body 120 is placed in the normal position by the switching pressure $P_{SL2}$ being supplied to the fluid chamber 138, so the second input port 124 that is supplied with the control pressure $P_{SLU}$ of the linear solenoid valve SLU is blocked off. Accordingly, while the switching pressure $P_{SL2}$ is output from the second switching valve SL2, the control pressure $P_{SLU}$ of the linear solenoid valve SLU functions as the control pressure for controlling the apply state of the lockup clutch 26.

As described above, the supply of hydraulic fluid to the forward clutch C1 (the reverse brake B1) and the supply of hydraulic fluid to the lockup clutch 26 are controlled in connection with the switching of the operating states of the first switching valve SL1 and the second switching valve SL2. Incidentally, the operating states of the first switching valve SL1 and the second switching valve SL2 are switched appropriately, according to the running state of the vehicle, by being energized and de-energized by the ECU 50.

Incidentally, in the hydraulic control circuit 100 structured as described above, if there is an on failure or an off failure of the first switching valve SL1, the second switching valve SL2, or the linear solenoid valve SLU, or if the valve sticks or the like in the lockup control valve 106 or the clutch apply control valve 102, a system structure for detecting that failure is necessary. Regarding this, the related art detects an abnormality by providing a hydraulic sensor and an oil pressure switch, for example. However, this naturally means that the hydraulic sensor and the oil pressure switch must be provided, and moreover, a system to constantly detect abnormalities in the hydraulic sensor and the oil pressure switch and the like is also required, which makes the hydraulic control circuit 100 complex. Therefore, in this example embodiment, the failure state of each part is detected based on the operating states of the forward clutch C1 and the reverse brake B1 (hereinafter simply referred to as forward-reverse clutches unless otherwise specified), and the operating state of the lockup clutch 26.

Figure 5:
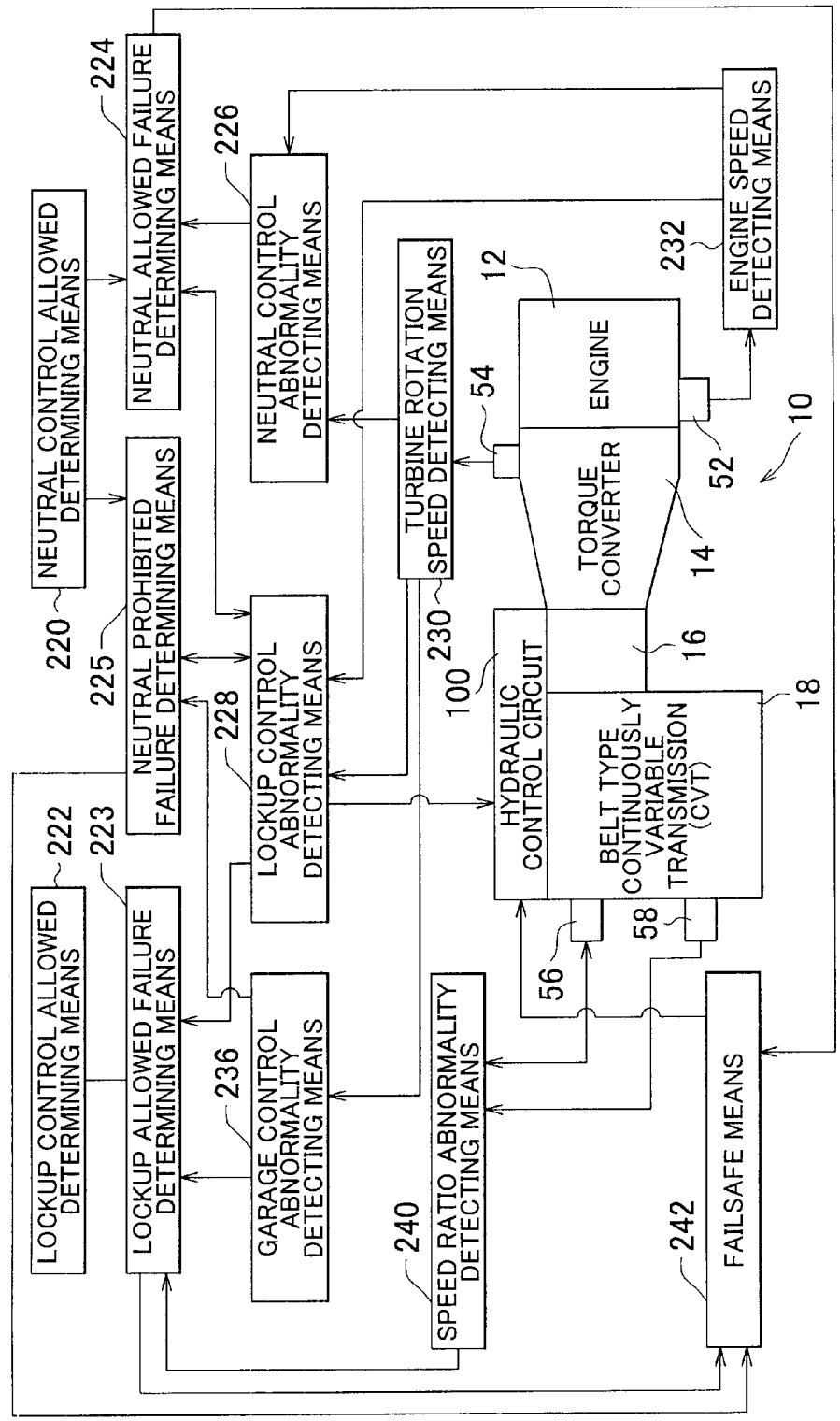
FIG. 5 is a functional block line diagram of the main control functions performed by an electronic control unit shown in FIG. 2, according to the example embodiment of the invention.

FIG. 5 is a functional block diagram of the main control functions of the ECU 50. The functional block diagram shown in FIG. 5 lists only means related to failure detection in the hydraulic control circuit 100. Therefore, for example, shift controlling means for executing shift control of the CVT 18 and belt squeezing force controlling means for controlling the squeezing force of the drive belt 48 and the like are omitted. When detecting the failure state, the ECU 50 changes the failure determination method according to the operating state of the lockup clutch 26, or more specifically, whether lockup control is allowed, and the operating state of the neutral control, or more specifically, whether neutral control is allowed.

Neutral control allowed determining means 220 determines whether the current running state is a state in which neutral control is allowed. The neutral control allowed determining means 220 determines whether the vehicle speed V is equal to or less than a preset stopped determining speed while the shift lever 74 is in a running position (i.e., the "D", the "R", or the "L" position), for example, and whether the foot brake pedal is being depressed. If it is determined that the shift position is the "D", the "R", or the "L" position, the vehicle speed V is equal to or less than the stopped determining speed, and the foot brake pedal is being depressed, the neutral control allowed determining means 220 determines that neutral control is allowed. If, on the other hand, even one of those conditions is not satisfied, the neutral control allowed determining means 220 determines that neutral control is prohibited. The neutral control allowed determining means 220 also determines that neutral control is prohibited in a vehicle not provided with the neutral control function. Also, when neutral control is allowed, neutral allowed failure determining means 224 is executed, and when neutral control is prohibited, neutral prohibited failure determining means 225 is executed.

Lockup control allowed determining means 222 determines whether lockup control of the lockup clutch 26 is allowed. The lockup control allowed determining means 222 determines whether lockup control is allowed based on the actual running state (i.e., the throttle valve opening amount $θ_{TH}$ and the vehicle speed V) from a pre-stored relationship (i.e., a map or a region line diagram) having a release region (i.e., lockup off) a slip control region, and an apply region (i.e., lockup on), with the throttle valve opening amount $θ_{TH}$ and the vehicle speed V as variables, as shown in FIG. 4, for example. More specifically, when the current running state is in the slip control region or the apply region, the lockup control allowed determining means 222 determines that lockup control is allowed. If, on the other hand, the running state is in the release region, the lockup control allowed determining means 222 determines that lockup control is prohibited. When lockup control is allowed, lockup allowed failure determining means 223 is executed. Also, the determination as to whether lockup control is allowed may also be made based on the hydraulic fluid temperature in the torque converter or the like.

The specific failure determination method is changed according to the determination results of the neutral control allowed determining means 220 and the lockup control allowed determining means 222. First, a failure determination when neutral control is allowed will be described. When neutral control is allowed, the neutral allowed failure determining means 224 is executed.

The neutral allowed failure determining means 224 first outputs a command to neutral control abnormality detecting means 226 to determine whether the forward-reverse clutches (i.e., the forward clutch C1 and the reverse brake B1) are unable to release, while neutral control is being executed. The neutral control abnormality detecting means 226 then determines whether the forward-reverse clutches are unable to release, based on the turbine rotation speed Nt detected by turbine rotation speed detecting means 230, for example.

Figure 6:
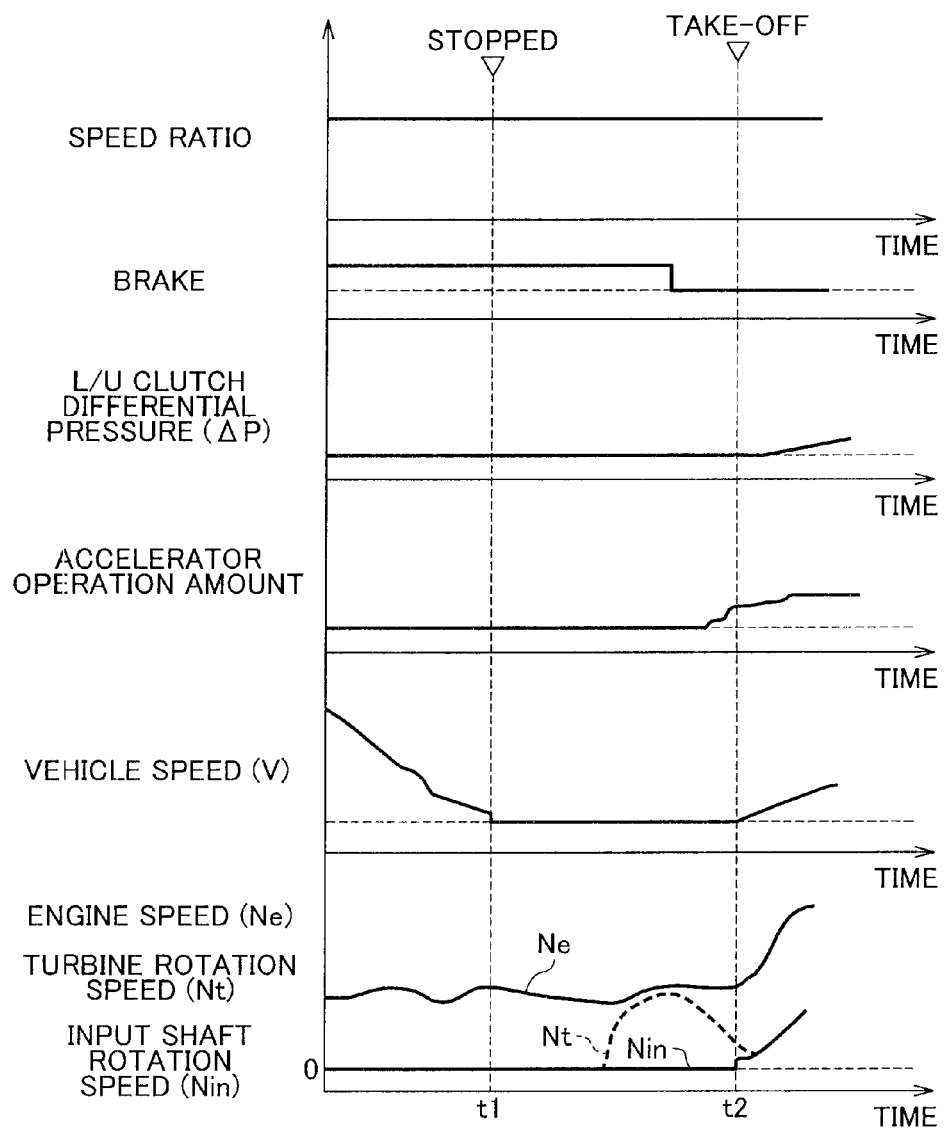
FIG. 6 is a time chart showing the state of the vehicle when the forward-reverse clutch is released during neutral control, according to the example embodiment of the invention.

During neutral control, if operation is normal, the forward-reverse clutches will be released, so the transmission of power between the turbine runner 14t and the CVT 18 is interrupted, and the turbine rotation speed Nt will increase as a result of the turbine runner 14t being dragged by the rotation of the pump impeller 14p (i.e., the rotation of the engine 12), from the fluid power transmitting action of the torque converter 14. More specifically, as shown in the time chart in FIG. 6, when the vehicle stops at time t1 by the brake pedal being depressed, neutral control starts and the forward-reverse clutches release, so the turbine rotation speed Nt increases, as shown by the broken line. However, when the forward-reverse clutches do not release during neutral control, the CVT 18 and the turbine shaft 34 become coupled together such that power can be transmitted therebetween. Therefore, the turbine rotation speed Nt does not increase but instead becomes zero like the input shaft rotation speed Nin shown in FIG. 6. Accordingly, the neutral control abnormality detecting means 226 detects the turbine rotation speed Nt during neutral control, and detects whether the forward-reverse clutches are unable to release based on whether that turbine rotation speed Nt is greater than a predetermined rotation speed, for example. More specifically, the neutral control abnormality detecting means 226 determines that the forward-reverse clutches are released when the turbine rotation speed Nt exceeds the predetermined rotation speed, and determines that the forward-reverse clutches are unable to release when the turbine rotation speed Nt is less than the predetermined rotation speed. Incidentally, the apply state of the forward-reverse clutches may also be determined by directly detecting the hydraulic pressure of the forward-reverse clutches or the like.

Here, if it is determined by the neutral control abnormality detecting means 226 that the forward-reverse clutches are unable to release, there may be a failure in which the modulator pressure LPM2 is constantly supplied to the forward-reverse clutches due to the clutch apply control valve 102 being stuck in the normal position, such as an off failure of the first switching valve SL1, an on failure of the second switching valve SL2, or a sticking failure due to the valve sticking in the normal position in the clutch apply control valve 102. Alternatively, there may be a sticking failure of the friction elements of the forward-reverse clutches, or further, the control pressure $P_{SLU}$ may be constantly supplied to the forward-reverse clutches even if the clutch apply control valve 102 is in the fail position due to an on failure of the linear solenoid valve SLU. The neutral allowed failure determining means 224 assumes every conceivable failure based on the fact that the forward-reverse clutches are unable to release as a possible failure, and then executes lockup control abnormality detecting means 228 to distinguish the failure responsible for the forward-reverse clutches not being able to release from the rest of the possible failures. Incidentally, an on failure of the first switching valve SL1, the second switching valve SL2, or the linear solenoid valve refers to a failure in which hydraulic pressure is output even though a command to not output hydraulic pressure from the valves is being output. An off failure refers to a failure in which hydraulic pressure is not output even though a command to output hydraulic pressure from the valves is being output.

If the neutral control abnormality detecting means 226 determines that the forward-reverse clutches are unable to release, the lockup control abnormality detecting means 228 outputs a command to the hydraulic control circuit 100 to increase the control pressure $P_{SLU}$ of the linear solenoid valve SLU while the lockup clutch 26 is released, and determines whether the lockup clutch 26 is applied in that state. During normal operation, the lockup relay valve 104 is switched to the release position (i.e., the OFF position) while the lockup clutch 26 is released, so the lockup clutch 26 will not apply even if the control pressure $P_{SLU}$ of the linear solenoid valve SLU increases. However, if there is an on failure in the second switching valve SL2, the switching pressure $P_{SL2}$ will cause the lockup relay valve 104 to switch to the apply position (i.e., the ON position), so the lockup clutch 26 will apply if the control pressure $P_{SLU}$ increases. Incidentally, in the apply determination of the lockup clutch 26, the turbine rotation speed Nt is detected by turbine rotation speed detecting means 230 and the engine speed Ne is detected by engine speed detecting means 232, for example, and it is determined that the lockup clutch 26 is applied if rotation speed difference NSLP between the two (i.e., Ne−Nt) is equal to or less than a predetermined value.

Accordingly, the lockup control abnormality detecting means 228 increases the control pressure $P_{SLU}$ of the linear solenoid valve SLU while the lockup clutch 26 is released. If application of the lockup clutch 26 is detected at this time, the neutral allowed failure determining means 224 determines that there is an on failure in the second switching valve SL2. That is, in the neutral control abnormality detecting means 226, it is determined (i.e., confirmed) that, of the plurality of individual possible failures, the on failure in the second switching valve SL2 is the failure that has actually occurred.

On the other hand, if the lockup clutch 26 is not applied even through the control pressure $P_{SLU}$ of the linear solenoid valve SLU is increased by the lockup control abnormality detecting means 228, the lockup control abnormality detecting means 228 then reduces the control pressure $P_{SLU}$ of the linear solenoid valve SLU until the lockup clutch 26 releases (i.e., to substantially zero) while the switching pressure $P_{SL2}$ of the second switching valve SL2 is output, i.e., while the lockup relay valve 104 is switched to the apply position (i.e., the ON position). If at this time the linear solenoid valve SLU is operating normally, the differential pressure ΔP between the apply side fluid chamber 162 and the release side fluid chamber 166 will be substantially zero even if the lockup relay valve 104 is in the apply position, so the lockup clutch 26 will release. However, if there is an on failure of the linear solenoid valve SLU, that differential pressure ΔP will increase from the output of the control pressure $P_{SLU}$ and cause the lockup clutch 26 to apply.

Figure 7:
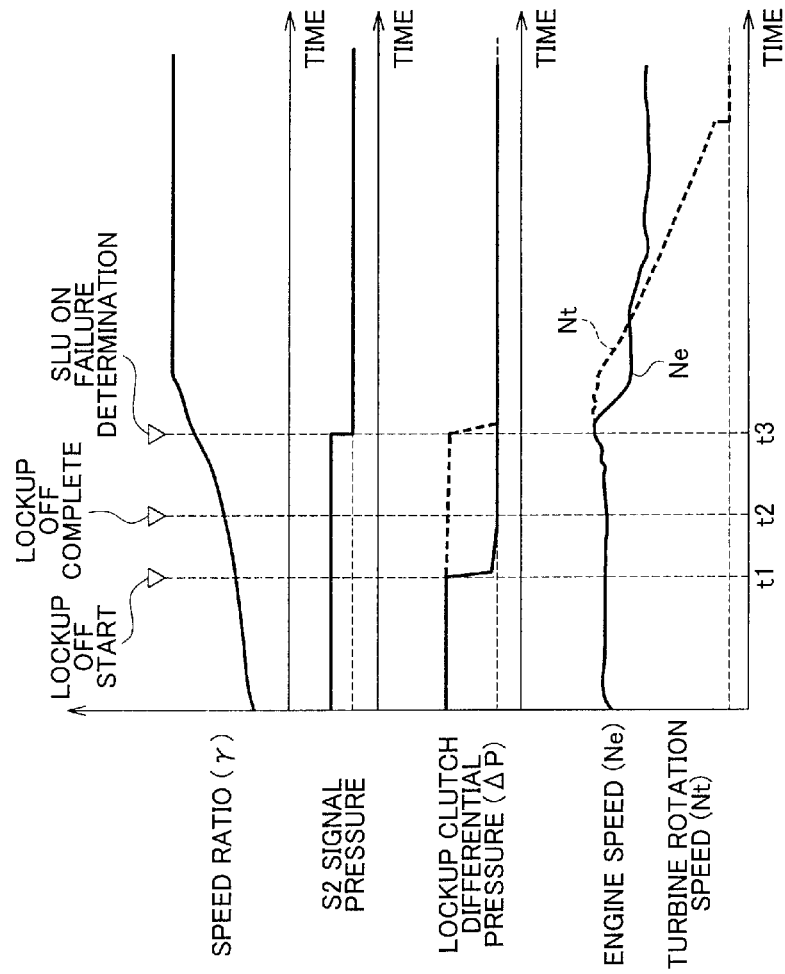
FIG. 7 is a time chart showing the state of the vehicle when an on failure has occurred in a linear solenoid valve when releasing the lockup clutch, according to the example embodiment of the invention.

Now the failure described above will be described using the time chart in FIG. 7. At time t1 when the lockup clutch 26 starts to release, if operation is normal, the differential pressure ΔP of the lockup clutch 26 will decrease to the command value shown by the solid line when the control pressure $P_{SLU}$ of the linear solenoid valve SLU is reduced while the switching pressure $P_{SL2}$ of the second switching valve SL2 continues to be output. However, when an on failure occurs in the linear solenoid valve SLU, the differential pressure ΔP is maintained so the lockup clutch 26 does not release, as shown by the broken line. Therefore, if operation is normal, the rotation speed difference NSLP between the engine speed Ne and the turbine rotation speed Nt occurs after time t1, but does not occur at time t2 when the lockup clutch 26 releases completely. If the rotation speed difference NSLP does not occur, i.e., if the lockup clutch 26 does not release, after a predetermined period of time (between time t2 and time t3) has passed, the lockup control abnormality detecting means 228 determines at time t3 that there is an abnormality in the lockup clutch 26. Incidentally, if the switching pressure $P_{SL2}$ of the second switching valve SL2 is stopped at time t3, it means that the lockup relay valve 104 is switched to the OFF position, so the lockup clutch 26 will release and the rotation speed difference $N_{SLP}$ will occur between the engine speed Ne and the turbine rotation speed Nt.

Accordingly, if the lockup clutch 26 does not release even after the control pressure $P_{SLU}$ has been reduced, the neutral allowed failure determining means 224 determines that an on failure of the linear solenoid valve SLU has occurred. That is, the neutral allowed failure determining means 224 confirms in the neutral control abnormality detecting means 226 the on failure of the linear solenoid valve SLU as the failure that has actually occurred, from among the plurality of individual possible failures.

Also, if the lockup clutch 26 releases when the control pressure $P_{SLU}$ of the linear solenoid valve SLU is reduced, the neutral allowed failure determining means 224 determines that, of the plurality of individual possible failures, an off failure of the first switching valve SL1, a sticking failure in the normal position of the clutch apply control valve 102, or a sticking failure of the friction elements in the forward-reverse clutches has occurred.

Next, failure determination when neutral control is prohibited will be described based on the neutral control allowed determining means 220. When neutral control is prohibited, the neutral prohibited failure determining means 225 is executed.

The neutral prohibited failure determining means 225 first commands the lockup control abnormality detecting means 228 to reduce the control pressure $P_{SLU}$ of the linear solenoid valve SLU to a pressure at which the lockup clutch 26 will release (i.e., a pressure of approximately zero) while the switching pressure $P_{SL2}$ of the second switching valve SL2 continues to be output, i.e., while the lockup relay valve 104 is switched to the apply position (i.e., the ON position). If the lockup clutch 26 does not release (i.e., is unable to release) even after the control pressure $P_{SLU}$ of the linear solenoid valve SLU has been reduced, there may be an on failure of the linear solenoid valve SLU, a sticking failure of the friction elements of the lockup clutch 26, or a sticking failure of the lockup control valve 106 in the complete apply position (i.e., the ON position). The neutral prohibited failure determining means 225 assumes every conceivable failure based on the fact that the lockup clutch 26 is unable to release as a possible failure, and then executes garage control abnormality detecting means 236, which will be described later, to identify the failure responsible for the inability of the lockup clutch 26 to release from among the possible failures.

The garage control abnormality detecting means 236 determines whether the forward-reverse clutches have suddenly applied during garage control that is executed when the shift lever 74 is shifted from the "N" position into the "D", the "L", or the "R" position by the driver. When garage control is executed normally, the control pressure $P_{SLU}$ of the linear solenoid valve SLU smoothly increases such that the vehicle takes off smoothly. However, if an on failure has occurred in the linear solenoid valve SLU, high hydraulic pressure is supplied to the forward-reverse clutches at the time when the shift lever 74 is shifted, so the forward-reverse clutches are applied suddenly. Therefore, if it is determined that the forward-reverse clutches have applied suddenly, the neutral prohibited failure determining means 225 determines the on failure of the linear solenoid valve SLU as the failure that has actually occurred. Incidentally, sudden application of the forward-reverse clutches is determined based on, for example, whether the rate of change in the turbine rotation speed Nt detected by the turbine rotation speed detecting means 230 is greater than a standard rate of change during garage control that is set in advance, or whether the apply time of the forward-reverse clutches is shorter than a reference time during garage control that is set in advance. Also, it is also possible to detect the hydraulic pressure of the forward-reverse clutches using a hydraulic sensor, and then determine whether the forward-reverse clutches have applied suddenly based on the rate of change in that hydraulic pressure, for example.

On the other hand, if the forward-reverse clutches have not applied suddenly, the neutral prohibited failure determining means 225 determines that either a sticking failure of the friction elements of the lockup clutch 26 has occurred, or a sticking failure of the lockup control valve 106 in the complete apply position has occurred.

Next, the lockup allowed failure determining means 223 that is executed when lockup control is allowed by the lockup control allowed determining means 222 will be described. The lockup allowed failure determining means 223 first commands the lockup control abnormality detecting means 228 to determine whether the lockup clutch 26 is unable to apply during lockup control. Incidentally, the inability of the lockup clutch 26 to apply is determined based on, for example, the rotation speed difference NSLP of the turbine rotation speed Nt and the engine speed Ne (i.e., Ne−Nt) not being equal to or less than a predetermined value. Here, if the lockup clutch 26 is unable to apply, there may be an on failure of the first switching valve SL1, an off failure of the second switching valve SL2, an off failure of the linear solenoid valve SLU, a sticking failure of the lockup relay valve 104 in the release position (i.e., the OFF position), or a μ decrease in the friction elements of the lockup clutch 26. The lockup allowed failure determining means 223 assumes every conceivable failure based on the inability of the lockup clutch 26 to apply as a possible failure, and then executes garage control abnormality detecting means 236 and speed ratio abnormality detecting means 240, which will be described later, to distinguish and identify the failure responsible for the inability of the lockup clutch 26 to apply from among the possible failures.

The lockup allowed failure determining means 223 first executes the garage control abnormality detecting means 236. This garage control abnormality detecting means 236 determines whether the forward-reverse clutches are unable to apply when the garage control is executed in response to a shift operation by the driver. Here, when the forward-reverse clutches do not apply (i.e., are unable to apply), an off failure in which control pressure $P_{SLU}$ is not output from the linear solenoid valve SLU is occurring, so the lockup allowed failure determining means 223 determines that, of all of the possible failures, an off failure of the linear solenoid valve SLU has occurred.

On the other hand, in the garage control abnormality detecting means 236, when the forward-reverse clutches are applied, the lockup allowed failure determining means 223 then executes the speed ratio abnormality detecting means 240. The speed ratio abnormality detecting means 240 calculates the speed ratio γ of the CVT 18, fixes that speed ratio γ at a speed ratio γa (approximately 1.0) that is preset during a failure, and determines whether the speed ratio γ does not follow a target speed ratio γ* set according to the accelerator operation amount Acc and the vehicle speed V or the like. Here, if an on failure of the first switching valve SL1 has occurred, the clutch apply control valve 102 will constantly be switched to the fail/garage position, the pressures of the driving side hydraulic actuator 42c and the driven side hydraulic actuator 46c will be the same, and the speed ratio γ of the CVT 18 will be the failure speed ratio γa. Also, if an off failure of the second switching valve SL2 occurs, the clutch apply control valve 102 will be switched to the normal position by the spring 134 as long as the switching pressure $P_{SL1}$ is not output from the first switching valve SL1, so the speed ratio γ will follow the target speed ratio γ*. Therefore, the speed ratio abnormality detecting means 240 calculates the speed ratio γ(=input shaft rotation speed Nin/output shaft rotation speed Nout) of the CVT 18, and if that speed ratio γ does not follow the target speed ratio γ* but instead becomes the failure speed ratio γa, the lockup allowed failure determining means 223 determines that an on failure has occurred in the first switching valve SL1. If, on the other hand, the speed ratio γ follows the target speed ratio γ* when the switching pressure $P_{SL1}$ is not output from the first switching valve SL1, the lockup allowed failure determining means 223 determines that an off failure has occurred in the second switching valve SL2, a sticking failure has occurred in which the lockup relay valve 104 is stuck on the release position side, or a μ decrease has occurred in the friction elements of the lockup clutch 26.

Failsafe means 242 executes a failsafe corresponding to a failure identified by the neutral allowed failure determining means 224, the neutral prohibited failure determining means 225, or the lockup allowed failure determining means 223. Incidentally, during the execution of the failure determining means, the failsafe means 242 is not executed when the possible failures are detected, but is instead executed at the time when the failure is identified (i.e., confirmed). When an on failure of the linear solenoid valve SLU, for example, has been identified, the failsafe means 242 prohibits neutral control and/or prohibits lockup control of the lockup clutch 26. Accordingly, engine stall is prevented by prohibiting lockup control, and erroneous learning of the release amount of the forward-reverse clutches during neutral control is prevented.

Figure 8:
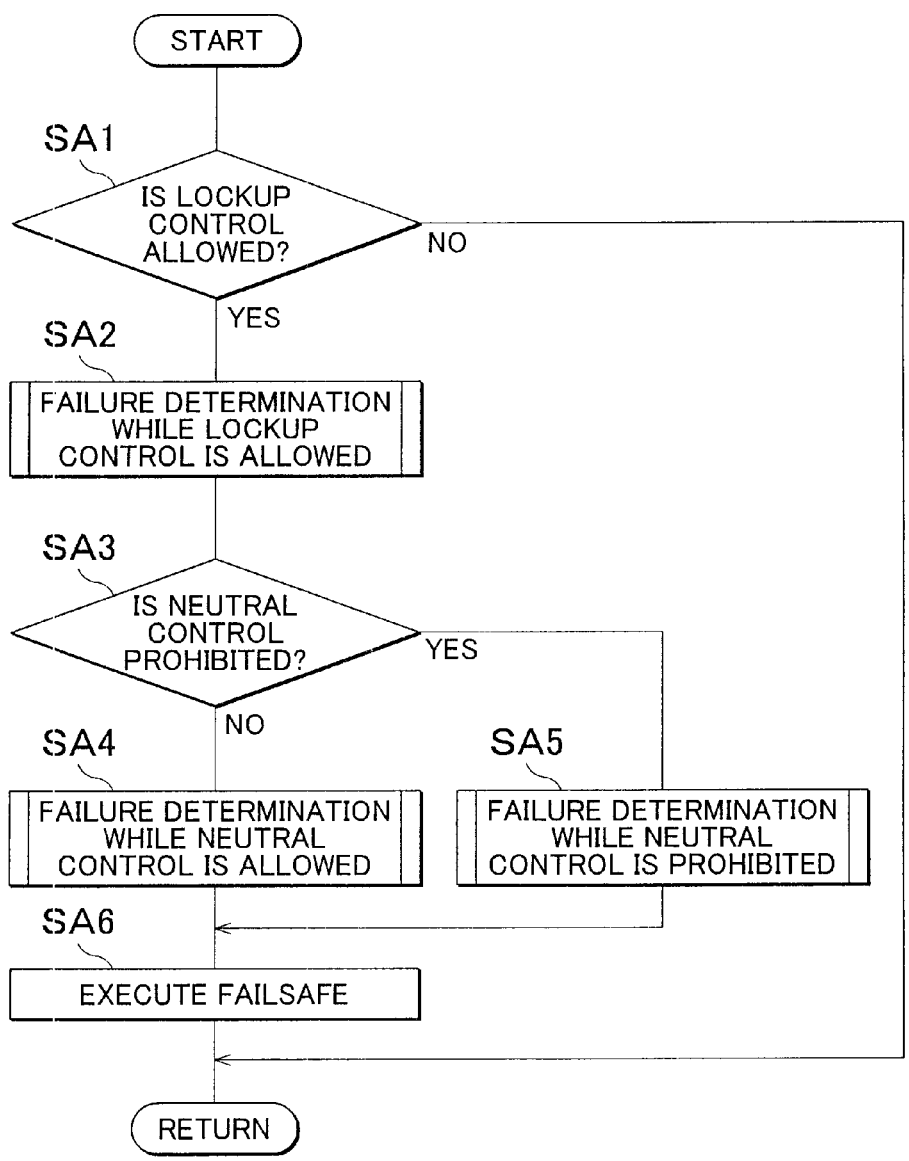
FIG. 8 is a flowchart illustrating the main parts of a control operation of the electronic control unit, according to the example embodiment of the invention.

FIG. 8 is a flowchart illustrating the main control operations of the ECU 50. First, in step SA1 that corresponds to the lockup control allowed determining means 222, it is determined whether lockup control is allowed. If the determination in step SA1 is no, this cycle of the routine ends and the process returns to step SA1 where the same determination is made again. If, on the other hand the determination in step SA1 is yes, then a failure determination when lockup is allowed is made in step SA2 that mainly corresponds to the lockup allowed failure determining means 223.

The control operation of step SA2 will now be described with reference to FIG. 9 which is a flowchart illustrating a control operation that is executed when lockup control of the lockup clutch 26 is allowed. If the determination in step SA1 in FIG. 8 is yes, then it is first determined in step SB 1 that corresponds to the lockup control abnormality detecting means 228 whether the lockup clutch 26 is unable to apply during lockup control. If the determination in step SB1 is no, this cycle of the routine ends. If, on the other hand, it is determined that the lockup clutch 26 is unable to apply, then it is determined in step SB2 that corresponds to the lockup allowed failure determining means 223 that a possible failure, from among a possible on failure of the first switching valve SL1, a possible off failure of the second switching valve SL2, a possible off failure of the linear solenoid valve SLU, a possible sticking failure of the lockup relay valve 104 in the release position (i.e., the OFF position), and a possible failure in which there is a μ decrease in the friction elements of the lockup clutch 26, has occurred. Incidentally, which of these failures has actually occurred is not identified, so all are determined to be possible failures.

In step SB3 that corresponds to the garage control abnormality detecting means 236, it is determined whether the forward-reverse clutches that are applied in garage control that is executed when the shift lever 74 is switched by the driver from the "N" position into any one of the "D", the "L", or the "R" positions are unable to apply when garage control is executed. If the determination in step SB3 is yes, i.e., if it is determined that the forward-reverse clutches are unable to apply, then it is determined in step SB6 that corresponds to the lockup allowed failure determining means 223 that an off failure of the linear solenoid valve SLU has occurred, and this cycle of the routine ends. If, on the other hand, the determination in step SB3 is no, then it is determined in step SB4 that corresponds to the speed ratio abnormality detecting means 240 whether the speed ratio γ of the CVT 18 is fixed at the speed ratio γa that is set during a failure. If the determination in step SB4 is yes, then it is determined in step SB7 that corresponds to the lockup allowed failure determining means 223 that an on failure of the first switching valve SL1 has occurred, and this cycle of the routine ends. If, on the other hand, the determination in step SB4 is no, then it is determined in step SB5 that corresponds to the lockup allowed failure determining means 223 that an off failure of the second switching valve SL2, a sticking failure of the lockup relay valve 104 in the release position (i.e., the OFF position), or a failure in which there is a μ decrease in the lockup clutch 26 has occurred, and this cycle of the routine ends.

Returning to FIG. 8, when step SA2 (i.e., the lockup allowed failure determining means 223) is executed, it is then determined in step SA3 that corresponds to the neutral control allowed determining means 220 whether neutral control is being prohibited or whether the neutral control function is an available. If the determination in step SA3 is yes, then step SA5 that corresponds to the neutral prohibited failure determining means 225 is executed. If, on the other hand, the determination in step SA3 is no, then step SA4 that corresponds to the neutral allowed failure determining means 224 is executed.

First, the control operation of step SA4 that corresponds to the neutral allowed failure determining means 224 that is executed when the determination in step SA3 is no will be described with reference to the flowchart in FIG. 10. In step SA4, first as shown in FIG. 10, it is determined in step SC1 that corresponds to the neutral control abnormality detecting means 226 whether the forward-reverse clutches are unable to release during neutral control. If the determination in step SC1 is no, then this cycle of the routine ends. If, on the other hand, the determination in step SC1 is yes, then it is determined in step SC2 that corresponds to the neutral allowed failure determining means 224 that a possible failure, from among a possible off failure of the first switching valve SL1, a possible on failure of the second switching valve SL2, a possible on failure of the linear solenoid valve SLU, a possible sticking failure of the clutch apply control valve 102 in e normal position, and a possible sticking failure of the friction elements of the forward-reverse clutches, has occurred. Incidentally, which of these failures has actually occurred is not identified, so all are determined to be possible failures.

In step SC3 that corresponds to the lockup control abnormality detecting means 228, it is determined whether the lockup clutch 26 is applied, when the control pressure $P_{SLU}$ of the linear solenoid valve SLU has been increased when the lockup clutch 26 is released, i.e., when the lockup relay valve 104 is switched to the released position (i.e., the OFF position). If the determination in step SC3 is yes, then it is determined in step SC7 that corresponds to the neutral allowed failure determining means 224 that an on failure of the second switching valve SL2 has occurred, and this cycle of the routine ends. If, on the other hand, the determination in step SC3 is no, then in step SC4 that corresponds to the lockup control abnormality detecting means 228, the control pressure $P_{SLU}$ of the linear solenoid valve SLU is reduced to a hydraulic pressure at which the lockup clutch 26 will release while the switching pressure $P_{SL2}$ of the second switching valve SL2 is continued to be output, and whether the lockup clutch 26 is unable to release at that time is determined. If the determination in step SC4 is yes, then it is determined in step SC6 that corresponds to the neutral allowed failure determining means 224 that an on failure of the linear solenoid valve SLU has occurred, and this cycle of the routine ends. If on the other hand, the determination in step SC4 is no, then it is determined in step SC5 that corresponds to the neutral allowed failure determining means 224 that an off failure of the first switching valve SL1, a sticking failure of the clutch apply control valve 102 in the normal position, or a sticking failure of the friction elements of the forward-reverse clutches has occurred, and then this cycle of the routine ends.

Next, the control operation of step SA5 that corresponds to the neutral prohibited failure determining means 225 that is executed when the determination in step SA3 in FIG. 8 is yes will be described with reference to the flowchart in FIG. 11. In step SA5, as shown in FIG. 11, first in step SDI that corresponds to the lockup control abnormality detecting means 228, the control pressure $P_{SLU}$ of the linear solenoid valve SLU is reduced to a hydraulic pressure at which the lockup clutch 26 will release (i.e., substantially zero) while the switching pressure $P_{SL2}$ continues to be output from the second switching valve SL2, and whether the lockup clutch 26 is unable to release at that time is determined. If the determination in step SD1 is no, this cycle of the routine ends. If, on the other hand, the determination in step SD1 is yes, then it is determined in step SD2 that corresponds to the neutral prohibited failure determining means 225 that a possible failure, from among a possible on failure of the linear solenoid valve SLU, a possible sticking failure of the friction elements of the lockup clutch 26, and a possible sticking failure of the lockup control valve 106 in the complete apply position (i.e., the ON position), has occurred. Incidentally, which of these failures has actually occurred is not identified, so all are determined to be possible failures.

In step SD3 that corresponds to the garage control abnormality detecting means 236, it is determined whether the forward-reverse clutches have applied suddenly when garage control, that is executed when the shift lever 74 is shifted by the driver from the "N" position into any one of the "D", the "L", or the "R" positions, is executed. If the determination in step SD3 is yes, then it is determined in step SD4 that corresponds to the neutral prohibited failure determining means 225 that an on failure of the linear solenoid valve SLU has occurred. If, on the other hand, the determination in step SD3 is no, then it is determined in step SD5 that corresponds to the neutral prohibited failure determining means 225 that either a sticking failure of the friction elements of the lockup clutch 26 has occurred or a sticking failure of the lockup control valve 106 in the complete apply position (i.e., the ON position) has occurred.

Returning to FIG. 8, in step SA6 that corresponds to the failsafe means 242, a failsafe according to the failure detected by step SA2, step SA4, or step SA5 is executed. For example, if an on failure of the linear solenoid valve SLU is detected, lockup control is prohibited and/or neutral control is prohibited. Accordingly, engine stall due to the lockup clutch 26 being applied and erroneous learning of the release amount of the forward-reverse clutches during neutral control and the like can be prevented. Incidentally, if a failure is not detected, the failsafe is not executed and this cycle of the routine ends.

Here, in the flowchart in FIG. 8, first the lockup allowed failure determining means 223 is executed when lockup control of the lockup clutch 26 is allowed. Then, the neutral allowed failure determining means 224 or the neutral prohibited failure determining means 225 is executed based on whether neutral control is being prohibited. However, as another mode, for example, as shown in FIG. 12, the control mode may be such that first it is determined in step SE1 whether neutral control is being prohibited, and depending on the result, either step SE2 that corresponds to the neutral allowed failure determining means 224 or step SE3 that corresponds to the neutral prohibited failure determining means 225 is executed. Then step SE5 that corresponds to the lockup allowed failure determining means 223 is executed according to the lockup control allowing determination of step SE4 that corresponds to the lockup control allowed determining means 222. Incidentally, the specific control in each step is the same as that in the description corresponding to FIGS. 8 to 11, so a description of the specific control will be omitted.

As described above, according to this example embodiment, the failure state of each part is detected based on the operating states of the forward-reverse clutches and the operating state of the lockup clutch 26. Therefore, the failure state of each part can be detected without providing a hydraulic sensor and an oil pressure switch or the like for detecting a failure. That is, the failure detecting performance can be ensured without increasing the number of parts and making the structure more complex.

Also, according to this example embodiment, the method by which a determination is made in detecting the failure state of the part, the determination method is changed according to the presence or absence of neutral control or the operating state of the neutral control, and the operating state of the lockup control, so optimum failure detection that corresponds to the operating state of the lockup control and the neutral control is executed. Also, executing failure determination according to the operating state makes it possible to detect the failure state of each part within a range that will not affect the running state of the vehicle.

Further, according to this example embodiment, it is determined that the there is an on failure in the second switching valve SL2 when, while neutral control is being executed, the forward-reverse clutches are unable to release and the lockup clutch 26 applies when the control pressure $P_{SLU}$ of the linear solenoid valve SLU is increased while the lockup clutch 26 is off. As a result, an on failure of the second switching valve SL2 is able to be distinguished from another failure.

Also, according to this example embodiment, it is determined that there is an on failure of the linear solenoid valve SLU if, while neutral control is being executed, the forward-reverse clutches are unable to release and the lockup clutch 26 does not apply when the control pressure $P_{SLU}$ of the linear solenoid valve SLU is increased while the lockup clutch 26 is off, and moreover, the lockup clutch 26 is unable to release when the second switching valve SL2 is made to remain on even after the control pressure $P_{SLU}$ of the linear solenoid valve SLU is reduced to a pressure at which the differential pressure $\Delta P$ of the lockup clutch 26 matches a release pressure. As a result, an on failure of the linear solenoid valve SLU is able to be distinguished from another failure.

Also, according to this example embodiment, it is determined that an off failure of the first switching valve SL1, a sticking failure of the clutch apply control valve 102 in the normal position, or a sticking failure of the friction elements of the forward-reverse clutches has occurred if, while the neutral control is being executed, the forward-reverse clutches are unable to release, the lockup clutch 26 does not apply when the control pressure $P_{SLU}$ of the linear solenoid valve SLU is increased while the lockup clutch 26 is off, and the lockup clutch 26 releases when the second switching valve SL2 is made to remain on even after the control pressure $P_{SLU}$ of the linear solenoid valve SLU is reduced to a pressure at which the differential pressure ΔP of the lockup clutch 26 matches a release pressure. As a result, an off failure of the first switching valve SL1 or the mechanical failures described above is able to be distinguished from another failure.

Also, according to this example embodiment, it is determined that an on failure of the linear solenoid valve SLU has occurred if, while the neutral control is prohibited, the lockup clutch 26 is unable to release when the second switching valve SL2 is made to remain on even after the control pressure $P_{SLU}$ of the linear solenoid valve SLU is reduced to a pressure at which the differential pressure ΔP of the lockup clutch 26 matches a release pressure, and it is determined that the forward-reverse clutches have applied suddenly during garage control. As a result, an on failure of the linear solenoid valve SLU is able to be distinguished from another failure. Also, that failure can be detected even when neutral control is prohibited.

Further, according to this example embodiment, it is determined that an off failure of the linear solenoid valve SLU has occurred if the lockup clutch 26 is unable to apply while lockup control of the lockup clutch 26 is being executed, and the forward-reverse clutches are unable to apply during garage control. As a result, an off failure o the linear solenoid valve SLU is able to be distinguished from another failure.

Also, according to this example embodiment, it is determined that an on failure of the first switching valve SL1 has occurred if the lockup clutch 26 is unable to apply while lockup control of the lockup clutch 26 is being executed, and the forward-reverse clutches are able to apply during garage control, and moreover, the speed ratio γ of the CVT 18 does not follow the target speed ratio γ*. As a result, an on failure of the first switching valve SL1 is able to be distinguished from another failure.

Also, according to this example embodiment, it is determined that an off failure of the second switching valve SL2, a sticking failure of the lockup relay valve 104 in the release position (i.e., the OFF position), or a μ decrease of the friction elements of the lockup clutch 26 has occurred if the lockup clutch 26 is unable to apply while lockup control of the lockup clutch 26 is being executed, and the forward-reverse clutches are able to apply during garage control, and moreover, the speed ratio γ of the CVT 18 is following the target speed ratio γ* normally. As a result, an off failure of the second switching valve SL2 or the other mechanical failures is able to be distinguished from another failure.

Also, according to this example embodiment, after the failure state has been determined, a failsafe according to that failure state is executed. As a result, an unnecessary failsafe is prevented and the ability to determine the portion where the failure has occurred can be improved. That is, it is possible to prevent a situation in which the portion where the failure has occurred is no longer able to be identified due to a failsafe being executed before the failure state is determined.

Also, according to this example embodiment, during an on failure of the linear solenoid valve, lockup control is prohibited and/or neutral control is prohibited. Therefore, engine stall can be prevented by prohibiting lockup control, and erroneous learning during learning control of the forward-reverse clutches can be prevented by prohibiting neutral control.

Also, according to this example embodiment, apply control of the forward-reverse clutches by the control pressure $P_{SLU}$ of the linear solenoid valve SLU is possible when the switching pressure $P_{SL1}$ is output from the first switching valve SL1, and apply control of the lockup clutch 26 by the control pressure $P_{SLU}$ of the linear solenoid valve SLU is possible when the switching pressure $P_{SL2}$ is output from the second switching valve SL2. As a result, control of the lockup clutch 26 and the forward-reverse clutches can be appropriately switched and executed with a single linear solenoid valve SLU by switching the first switching valve SL1 and the second switching valve SL2.

Heretofore, example embodiments of the invention have been described in detail with reference to the accompanying drawings. However, the invention may also be applied in other modes.

For example, in the example embodiment described above, the lockup relay valve 104 that switches the lockup clutch 26 and the lockup control valve 106 that controls the apply force of the lockup clutch 26 when lockup control is executed are provided separately, but the invention may also be applied with a structure in which those valves are controlled by a single valve.

Also, in the example embodiment described above, the apply state of the lockup and the apply state of the forward-reverse clutches are determined based on the engine speed Ne and the turbine rotation speed Nt. Alternatively, however, the apply state of the lockup and the apply state of the forward-reverse clutches may also be determined based on other means. For example, those determinations may also be made by directly detecting the apply pressure of the forward-reverse clutches and the apply pressure of the lockup clutch 26 (i.e., the differential pressure ΔP).

Also, in the example embodiment described above, the structure is such that the control pressure $P_{SLU}$ of the linear solenoid valve SLU is supplied to the forward-reverse clutches (i.e., the forward clutch C1 and the reverse brake B1) that change the direction of movement of the CVT 18. However, the invention may also be applied in a structure in which the control pressure $P_{SLU}$ of the linear solenoid valve SLU is supplied to a starting clutch of a stepped transmission, for example. Also, the running clutch is not necessarily limited to a forward-reverse clutch (i.e., the forward clutch C1 and the reverse brake B1) of a continuously variable transmission.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A control apparatus for a vehicular power transmitting apparatus, comprising:
   a first valve that controls a supply of hydraulic fluid to a running clutch in connection with a switching of an operating state of a first solenoid valve;
   a second valve that controls the supply of hydraulic fluid to a lockup clutch in connection with a switching of an operating state of a second solenoid valve; and a linear solenoid valve that selectively controls an apply force of the running clutch and the lockup clutch according to a supply of control pressure to the first valve and the second valve, wherein the control apparatus detects a failure state of a part related to an operation of the power transmitting apparatus by an operating state of the running clutch and an operating state of the lockup clutch, and wherein a method by which a determination is made in detecting the failure state of the part is changed according to the operating state of lockup control, and at least one of a presence or an absence of neutral control and an operating state of the neutral control.

2. The control apparatus according to claim 1, wherein a determination is made that an on failure of the second solenoid valve has occurred if, while the neutral control is being executed, the running clutch is unable to release, and the lockup clutch applies when a control pressure of the linear solenoid valve is increased while the lockup clutch is off.

3. The control apparatus according to claim 2, wherein after the failure state has been determined, a failsafe is executed if a failure of the part is detected.

4. The control apparatus according to claim 1, wherein a determination is made that an on failure of the linear solenoid valve has occurred if, while the neutral control is being executed, the running clutch is unable to release, and the lockup clutch does not apply when the control pressure of the linear solenoid valve is increased while the lockup clutch is off, and moreover, the lockup clutch is unable to release when the second solenoid valve is made to remain on even after the control pressure of the linear solenoid valve is reduced to a pressure at which a differential pressure of the lockup clutch matches a release pressure.

5. The control apparatus according to claim 4, wherein after the failure state has been determined, a failsafe is executed if a failure of the part is detected.

6. The control apparatus according to claim 5, wherein, if the failure of the part is detected, the lockup control is prohibited and/or the neutral control is prohibited as the failsafe.

7. The control apparatus according to claim 1, wherein a determination is made that at least one of an off failure of the first solenoid valve and another mechanical failure has occurred if, while the neutral control is being executed, the running clutch is unable to release, the lockup clutch does not apply when the control pressure of the linear solenoid valve is increased while the lockup clutch is off, and wherein the lockup clutch releases when the second solenoid valve is made to remain on even after the control pressure of the linear solenoid valve is reduced to a pressure at which a differential pressure of the lockup clutch matches a release pressure.

8. The control apparatus according to claim 7, wherein after the failure state has been determined, a failsafe is executed if a failure of the part is detected.

9. The control apparatus according to claim 1, wherein a determination is made that an on failure of the linear solenoid valve has occurred if, while the neutral control is prohibited, the lockup clutch is unable to release when the second solenoid valve is made to remain on even after the control pressure of the linear solenoid valve is reduced to a pressure at which a differential pressure of the lockup clutch matches a release pressure, and a determination is made that the running clutch has applied suddenly during garage control.

10. The control apparatus according to claim 9, wherein after the failure state has been determined, a failsafe is executed if a failure of the part is detected.

11. The control apparatus according to claim 10, wherein, if the failure of the part is detected, the lockup control is prohibited and/or the neutral control is prohibited as the failsafe.

12. The control apparatus according to claim 1, wherein a determination is made that an off failure of the linear solenoid valve has occurred if the lockup clutch is unable to apply while lockup control of the lockup clutch is being executed, and the running clutch is unable to apply during garage control.

13. The control apparatus according to claim 12, wherein after the failure state has been determined, a failsafe is executed if a failure of the part is detected.

14. The control apparatus according to claim 1, wherein a determination is made that an on failure of the first solenoid valve has occurred if the lockup clutch is unable to apply while lockup control of the lockup clutch is being executed, and the running clutch is able to apply during garage control, and moreover, the speed ratio of a transmission does not follow a target speed ratio.

15. The control apparatus according to claim 14, wherein after the failure state has been determined, a failsafe is executed if a failure of the part is detected.

16. The control apparatus according to claim 1, wherein a determination is made that at least one of an off failure of the second solenoid valve and another mechanical failure has occurred if the lockup clutch is unable to apply while lockup control of the lockup clutch is being executed, and the running clutch is able to apply during garage control, and moreover, the speed ratio of a transmission follows a target speed ratio.

17. The control apparatus according to claim 16, wherein after the failure state has been determined, a failsafe is executed if a failure of the part is detected.

18. The control apparatus according to claim 1, wherein apply control of the running clutch by the control pressure of the linear solenoid valve is possible when switching pressure is output from the first solenoid valve, and apply control of the lockup clutch by the control pressure of the linear solenoid valve is possible when switching pressure is output from the second solenoid valve.

* * * * *